United States Patent
Chikugo et al.

(10) Patent No.: US 9,680,167 B2
(45) Date of Patent: Jun. 13, 2017

(54) SYSTEM FOR ADJUSTING TEMPERATURE OF COOLING-LIQUID FOR FUEL CELL, AND THERMOSTAT VALVE

(75) Inventors: Hayato Chikugo, Stuttgart (DE); Michihiko Matsumoto, Yokohama (JP); Tetsuya Aoki, Yokosuka (JP); Masato Odashima, Yokosuka (JP); Shinichiro Takemoto, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 755 days.

(21) Appl. No.: 14/129,168

(22) PCT Filed: Jun. 14, 2012

(86) PCT No.: PCT/JP2012/065254
§ 371 (c)(1),
(2), (4) Date: Dec. 24, 2013

(87) PCT Pub. No.: WO2013/002039
PCT Pub. Date: Jan. 3, 2013

(65) Prior Publication Data
US 2014/0147764 A1   May 29, 2014

(30) Foreign Application Priority Data

Jun. 30, 2011 (JP) ................. 2011-146105
Mar. 13, 2012 (JP) ................. 2012-056387

(51) Int. Cl.
| | | |
|---|---|---|
| H01M 8/04 | (2016.01) | |
| H01M 8/04007 | (2016.01) | |
| H01M 8/04029 | (2016.01) | |
| H01M 8/04701 | (2016.01) | |
| G05D 23/13 | (2006.01) | |

(52) U.S. Cl.
CPC .... *H01M 8/04067* (2013.01); *G05D 23/1333* (2013.01); *H01M 8/04029* (2013.01); *H01M 8/04723* (2013.01)

(58) Field of Classification Search
CPC ......... H01M 8/04029; H01M 8/04067; H01M 8/04723; G05D 23/1333; Y02E 60/50
See application file for complete search history.

(56) References Cited

U.S. PATENT DOCUMENTS

2003/0072981 A1   4/2003   Imaseki et al.
2010/0012738 A1   1/2010   Park
(Continued)

FOREIGN PATENT DOCUMENTS

JP   2002-161746 A   6/2002
JP   2007-120380 A   5/2007
(Continued)

OTHER PUBLICATIONS

Extended European Search Report, Feb. 4, 2015, 7 pages.

*Primary Examiner* — Marc Norman
(74) *Attorney, Agent, or Firm* — Foley & Lardner LLP

(57) ABSTRACT

A system for adjusting temperature of cooling-liquid comprises: a radiator; a cooling-liquid circulation flow-channel; a radiator bypass flow-channel; a thermostat valve; and a valve bypass flow-channel through which the cooling-liquid of the radiator bypass flow-channel is allowed to flow in a predetermined amount even if the thermostat valve is completely closed.

15 Claims, 19 Drawing Sheets

(56) References Cited

U.S. PATENT DOCUMENTS

| | | | | |
|---|---|---|---|---|
| 2014/0093796 A1* | 4/2014 | Aoki | ............... | H01M 8/04723 429/413 |
| 2014/0120440 A1* | 5/2014 | Nolan | ............... | H01M 8/04955 429/431 |
| 2014/0356748 A1* | 12/2014 | Yamazaki | ......... | H01M 8/04074 429/435 |

FOREIGN PATENT DOCUMENTS

| | | | |
|---|---|---|---|
| JP | 2007-294305 A | | 11/2007 |
| JP | 2007-305519 A | | 11/2007 |
| JP | 2009129879 A | * | 6/2009 |
| JP | 2009-264685 A | | 11/2009 |
| WO | WO 2007/108273 A1 | | 9/2007 |

* cited by examiner

SYSTEM FOR ADJUSTING TEMPERATURE OF COOLING-LIQUID FOR FUEL CELL, AND THERMOSTAT VALVE

TECHNICAL FIELD

The present invention relates to a system for adjusting temperature of cooling-liquid for a fuel cell, and a thermostat valve.

BACKGROUND ART

A cooling-liquid circulation flow-channel through which a cooling-liquid flows in circulation is connected to a fuel cell. And, a radiator (heat-releasing unit) is disposed on the way of the cooling-liquid circulation flow-channel. In addition, a radiator bypass flow-channel is disposed, which connects the cooling-liquid circulation flow-channel on the upstream side of the radiator and the cooling-liquid circulation flow-channel on the downstream side of the radiator. Furthermore, a three-way valve is disposed at a junction between the cooling-liquid circulation flow-channel and the radiator bypass flow-channel. With the foregoing configuration, the flow-rate of the cooling-liquid flowing through the radiator and the flow-rate of the cooling-liquid bypassing the radiator are regulated by the three-way valve. As a result, the cooling-liquid is conditioned at an appropriate temperature, and the fuel cell is conditioned at an adequate temperature in accordance with the operational state thereof.

Meanwhile, too much cost is required when an electronic control valve is used for the three-way valve. Therefore, in JP2007-305519A, the temperature of the cooling-liquid is adjusted by using a thermostat valve and by controlling the rotation of a cooling-liquid pump.

SUMMARY OF INVENTION

However, in the aforementioned conventional fuel cell systems, in order to elevate the temperature of the cooling-liquid, the cooling-liquid pump is operated intermittently, so that the circulation of cooling-water is made to be extremely slow, whereby elevating the temperature of the cooling-liquid nearby the fuel cell. However, in the forgoing technique, the temperature of the cooling-liquid that is supplied to the fuel cell is supplied by a thermostat, so that the temperature does not exceed a preset temperature of the thermostat, and that the water-temperature that is supplied to the fuel cell cannot be made variable as in the case of the three-way valve. For this reason, there is a room for improvement as a cooling system using a thermostat.

By focusing attention on the foregoing disadvantages, the present invention has been made. It is an object of the present invention to provide a system for adjusting temperature of cooling-liquid for a fuel cell and a thermostat valve, wherein the system and the thermostat valve allow the cooling-liquid that is supplied to the fuel cell to be set up at a temperature higher than a preset temperature of the thermostat.

According to an embodiment of the present invention, a system for adjusting temperature of cooling-liquid for a fuel cell is provided, wherein the system is provided with: a fuel cell; a radiator that radiates heat of the cooling-liquid; a cooling-liquid circulation flow-channel that is disposed in a manner that the fuel cell and the radiator are connected to each other so as to flow the cooling-liquid in circulation; a radiator bypass flow-channel that connects an upstream and a downstream of the radiator in a manner that the cooling-liquid bypasses the radiator; a thermostat valve that is disposed in the radiator bypass flow-channel whereby adjusting the flow-rate in the radiator bypass flow-channel; and a valve bypass flow-channel through which the cooling-liquid in the radiator bypass flow-channel flows with a predetermined amount even if the thermostat valve is completely closed.

Embodiments and advantages of the present invention are described in detail with reference to accompanied drawings.

DESCRIPTION OF EMBODIMENTS

First Embodiment

Figure 1:
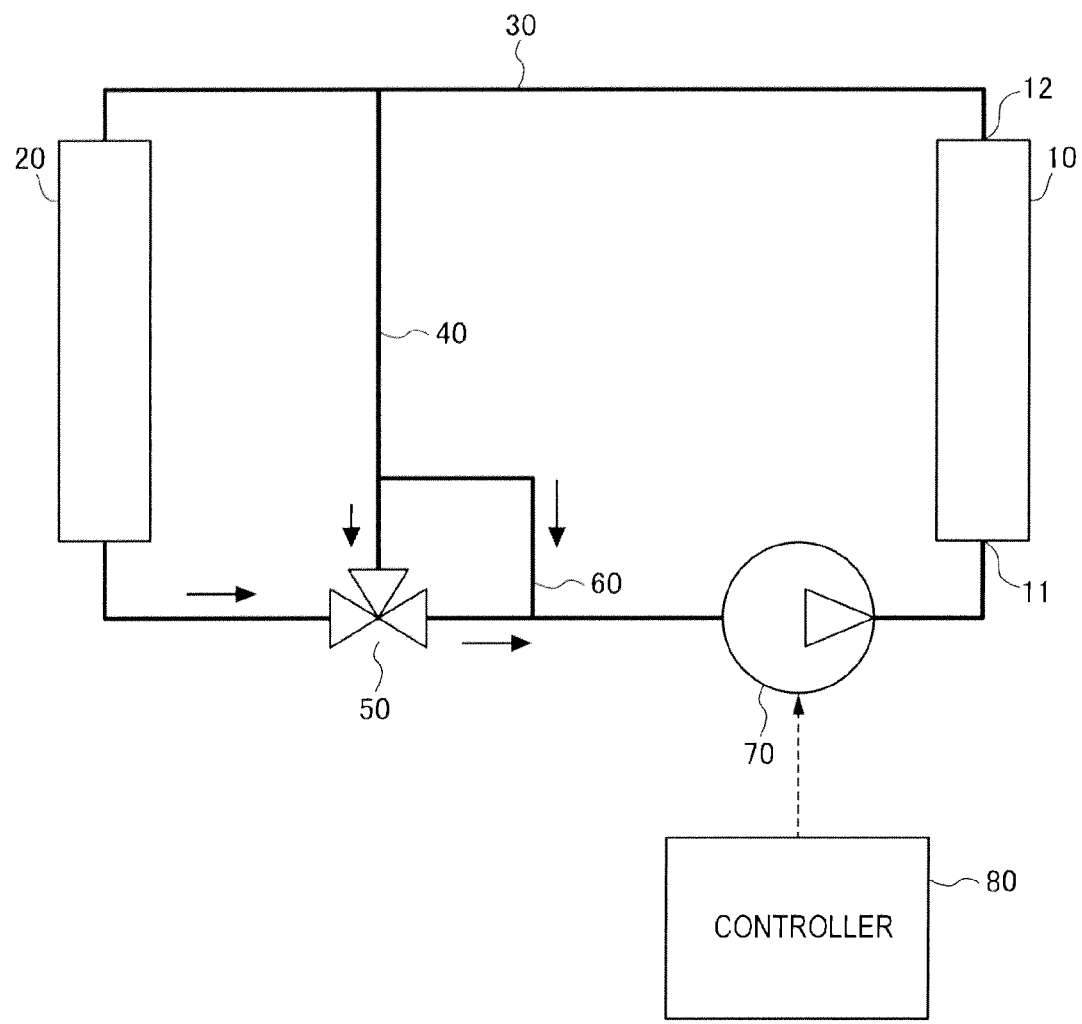
FIG. 1 is a drawing showing a first embodiment of the system for adjusting temperature of cooling-liquid for a fuel cell, according to the present invention.

FIG. 1 is a drawing showing a first embodiment of the system for adjusting temperature of cooling-liquid for a fuel cell according to the present invention.

A system 1 for adjusting temperature of cooling-liquid for a fuel cell comprises: a fuel cell 10, a radiator 20, a cooling-liquid circulation flow-channel 30, a radiator bypass flow-channel 40, a thermostat valve 50, a valve bypass flow-channel 60, a cooling-liquid pump 70, and a controller 80.

The fuel cell 10 is formed of a hundreds of membrane electrode assemblies (Membrane Electrode Assembly; MEA) piled up, wherein in this membrane electrode assembly a cathode catalyst layer and an anode catalyst layer are formed on both sides of an electrode membrane. When reactant gases (a cathode gas of O2 and an anode gas of H2) are supplied, reactions shown by the following equations (1-1) and (1-2) take place at the cathode catalyst layer and the anode catalyst layer in each of the membrane electrode assemblies (MEA), whereby generating an electric power.

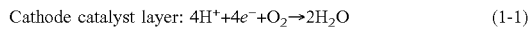

Cathode catalyst layer: $4H^+ + 4e^- + O_2 \rightarrow 2H_2O$    (1-1)

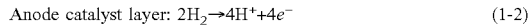

Anode catalyst layer: $2H_2 \rightarrow 4H^+ + 4e^-$    (1-2)

In order that the electric power generation reactions proceed efficiently, the electrolyte membrane is desirably kept in an appropriate wet condition. The wet condition of the electrolyte membrane correlates with the fuel cell temperature. When the fuel cell temperature is high, the wet condition of the electrolyte membrane is lowered and the membrane becomes easy to dry. When the fuel cell temperature is low, the wet condition is elevated, and the membrane becomes easy to wet. Therefore, it is important to control the fuel cell temperature. So that, the fuel cell 10 is connected with the cooling-liquid circulation flow-channel 30.

The radiator 20 radiates heat of the cooling-liquid. The radiator 20 is disposed in the cooling-liquid circulation flow-channel 30.

The cooling-liquid circulation flow-channel 30 connects the fuel cell 10 and the radiator 20 so as to make the cooling-liquid flow in circulation. Note that, in the present embodiment, the cooling-liquid flows to a direction of arrow in the figure for circulation. The circulating cooling-liquid inflows from an inlet 11 of the fuel cell 10 and outflows from an outlet 12.

The radiator bypass flow-channel 40 connects the cooling-liquid circulation flow-channel 30 on the upstream side of the radiator 20 and the cooling-liquid circulation flow-channel 30 on the downstream side of the radiator 20. When the cooling-liquid flows through the radiator bypass flow-channel 40, it bypasses the radiator 20.

The thermostat valve 50 is disposed at a place where the cooling-liquid circulation flow-channel 30 and the radiator bypass flow-channel 40 are connected with each other. In this embodiment, the thermostat valve 50 is disposed at a junction where the cooling-liquid flowing through the cooling-liquid circulating flow-channel 30 and the cooling-liquid flowing through the radiator bypass flow-channel 40 join together. The thermostat valve 50 is a three-way valve. The thermostat valve 50 adjusts the flow-rate of the cooling-liquid flowing from the cooling-liquid circulating flow-channel 30 and the flow-rate of the cooling-liquid flowing from the radiator bypass flow-channel 40, thereby discharging the cooling-liquid that has been adjusted at a predetermined temperature (thermostat setup temperature). The details of the thermostat valve 50 are described later.

The valve bypass flow-channel 60 connects together the radiator bypass flow-channel 40 and the cooling-liquid circulation flow-channel 30. When the cooling-liquid flows through the valve bypass flow-channel 60, it bypasses the thermostat valve 50. In this embodiment, the valve bypass flow-channel 60 connects together the radiator bypass flow-channel 40 on the upstream side of the thermostat valve 50 and the cooling-liquid circulating flow-channel 30 on the downstream side of the thermostat valve 50. As a result, a part of the cooling-liquid flowing through the radiator bypass flow-channel 40 branches off from the radiator bypass flow-channel 40 to the valve bypass flow-channel 60, whereby joining with the cooling-liquid circulation flow-channel 30 to bypass the thermostat valve 50.

The cooling-liquid pump 70 is disposed in the cooling-liquid circulation flow-channel 30. In the present embodiment, the cooling-liquid pump 70 is disposed between the thermostat valve 50 and the fuel cell 10 in the cooling-liquid circulation flow-channel 30. The cooling-liquid pump 70 is, for example, driven by an electric motor. The flow-rate of the cooling-liquid is adjusted by a rotation speed of the cooling-liquid pump 70. As the rotation speed of the cooling-liquid pump 70 is larger, the flow-rate of the cooling-liquid is larger.

The controller 80 is formed of a microcomputer that is equipped with a central processing unit (CPU), a read only memory (ROM), a random access memory (RAM), and an input and output interface (I/O interface). Signals detected by various sensors, which are necessary for controlling the system of adjusting the temperature of the cooling-liquid for the fuel cell, are made to enter into the controller 80.

Figure 2:
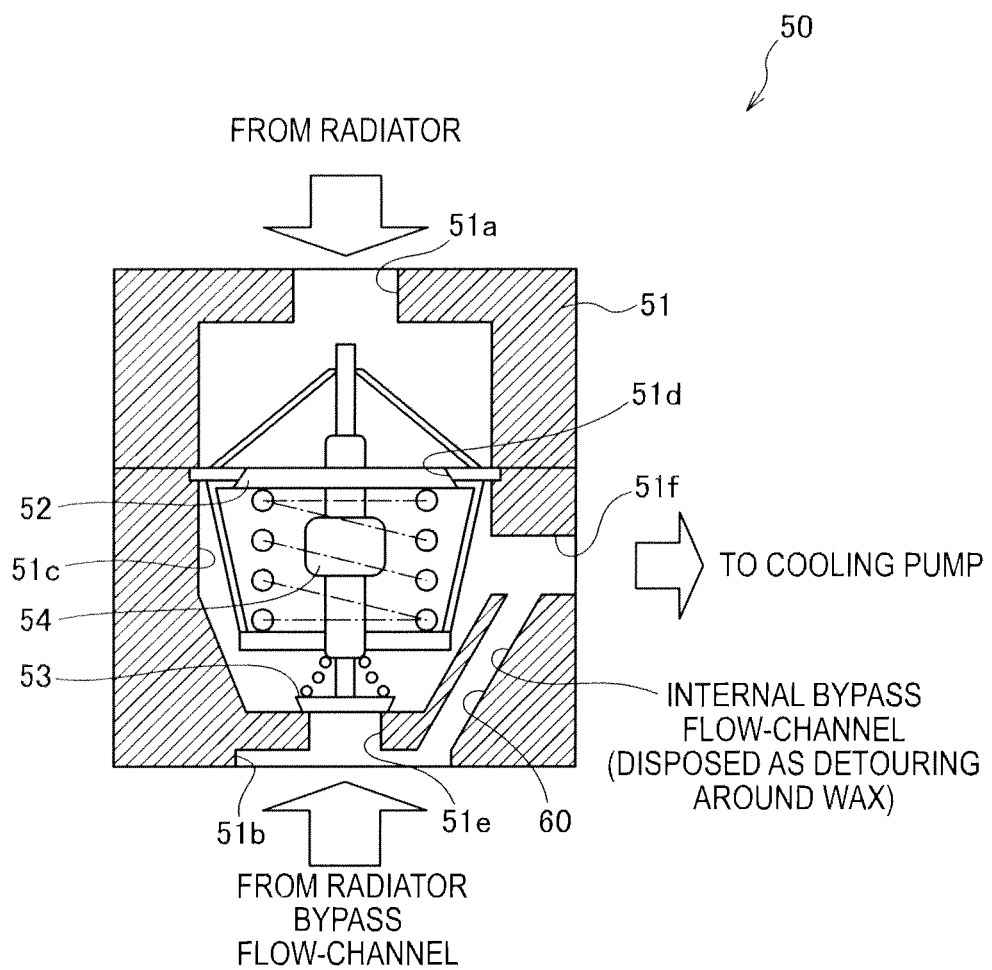
FIG. 2 is a cross-sectional drawing showing a structure of the thermostat valve according to the present invention.

FIG. 2 is a cross-sectional drawing showing a structure of the thermostat valve according to the present invention.

The thermostat valve 50 comprises a housing 51, a main valve 52, a bypass valve 53, and an expansion and contraction element 54.

In the housing 51, a low temperature zone 51a, a high temperature zone 51b, and an intermediate temperature zone 51b are formed. A low temperature cooling-liquid that is heat-dissipated by the radiator 20 flows into the low temperature zone 51a. A high temperature cooling-liquid, which flows through the radiator bypass flow-channel 40 and bypasses the radiator 20, flows into the high temperature zone 51$b$. The intermediate temperature zone 51$c$ communicates with the low temperature zone 51$a$ through an open mouth 51$d$ on the low temperature side, and also communicates with the high temperature zone 51$b$ through an open mouth 51$e$ on the high temperature side.

The main valve 52 gates the open mouth 51$d$ on the low temperature side.

The bypass valve 53 gates the open mouth 51$e$ on the high temperature side.

The expansion and contraction element 54 is connected with the main valve 52 and the bypass valve 53. The expansion and contraction element 54 includes wax (for example, paraffin wax) therein. The wax thermally expands in response to temperature, so that the main valve 52 and the bypass valve 53 are moved in response to temperature. That is, as the temperature of the intermediate temperature zone 51$c$ is higher, the opening of the main valve 52 becomes larger, whereby introducing the low temperature cooling-liquid into the intermediate temperature zone 51$c$. As the temperature of the intermediate temperature zone 51$c$ is lower, the opening of the bypass valve 53 becomes larger, whereby introducing the high temperature cooling-liquid into the intermediate temperature zone 51$c$.

Owing to the foregoing configuration, the cooling-liquid is adjusted at a predetermined temperature (thermostat setup temperature) in the intermediate temperature zone 51$c$ and flows out through an outflow-channel 51$f$.

The foregoing structure and actions are those of common thermostat valves, so that the explanations thereof are not described further.

Furthermore, as to the thermostat valve 50 of the present embodiment, in the housing 51, the bypass flow-channel 60 is formed, which connects together the high temperature zone 51$b$ and the outflow-channel 51$f$ that is continued to the intermediate temperature zone 51$c$.

Owing to the foregoing configuration, the high temperature cooling-liquid is mixed into the cooling-liquid that has been adjusted at a predetermined temperature (thermostat setup temperature) in the intermediate temperate zone 51$c$ and flows out through the outflow-channel 51$f$. By using the amount thus mixed, the temperature of the cooling-liquid that flows through the outflow-channel 51$f$ can be adjusted.

Figure 3:
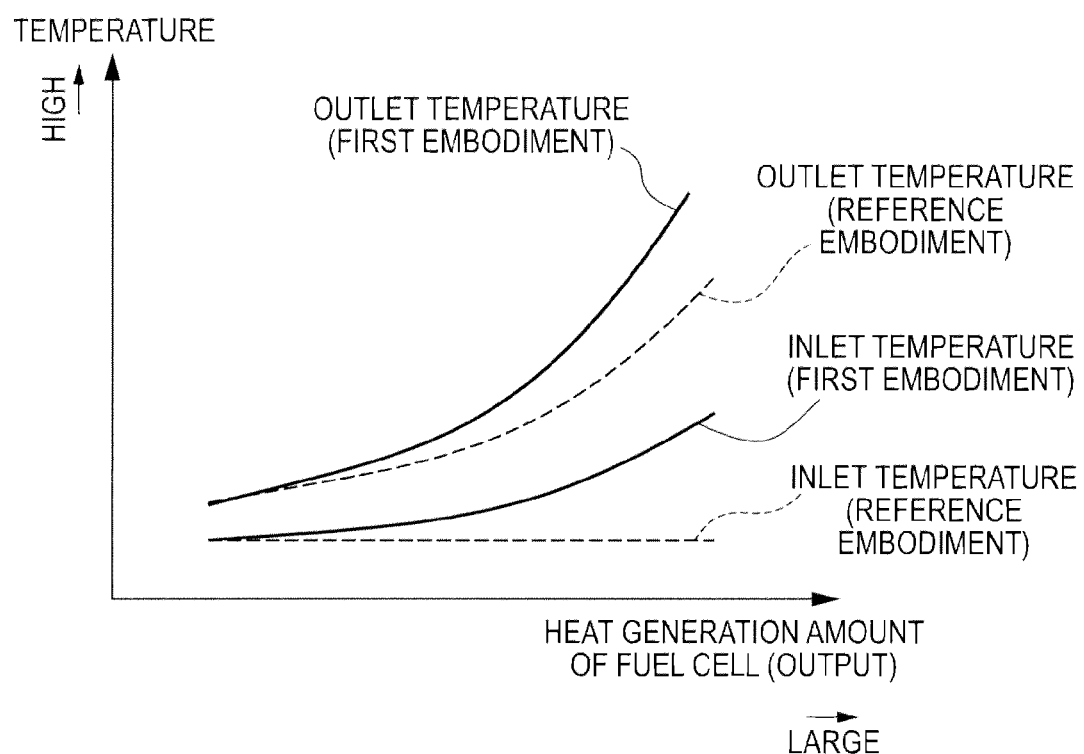
FIG. 3 is a drawing explaining action effects of a first embodiment.

Next, with reference to FIG. 3, advantageous effects of the present embodiment are explained. Note that, in advance of the explanation thereof, with reference to FIG. 19, a reference embodiment is described. Note that, the same numerals or symbols are imparted to zones or units that serve the same functions as above, and overlapping explanations are appropriately abbreviated.

In essence, this reference embodiment does not include the valve bypass flow-channel 60 as opposed to the first embodiment.

In the foregoing configuration, from the thermostat valve 50, the cooling-liquid that has been adjusted at a predetermined temperature (thermostat setup temperature) flows out. Therefore, as shown in FIG. 3, in the reference embodiment, regardless the electricity generated by the fuel cell, the cooling-liquid inlet temperature of the fuel cell is kept constant.

As the output of the fuel cell is larger, the reactions of the formulas (1-1) and (1-2) take place much more, whereby much more water is produced. If the water remains inside of the fuel cell, flooding possibly occurs. And thus, as the output is larger, it is preferable to elevate the cooling-liquid temperature so as to elevate the fuel cell temperature and to promote vaporization of the generated water. The generated water had better been vaporized, because the water can be easily discharged to the outside together with the cathode gas.

However, in the reference embodiment, the cooling-liquid inlet temperature of the fuel cell is constant, so that there is a possibility that the cooling-liquid temperature is not sufficiently high.

As oppose to the above, in this embodiment, the valve bypass flow-channel 60, which connects together the radiator bypass flow-channel 40 and the cooling-liquid circulation flow-channel 30, is disposed. By the valve bypass flow-channel 60, the high temperature cooling-liquid bypasses the thermostat valve 50 and is mixed into the cooling-liquid circulation flow-channel 30. Therefore, the cooling-liquid inlet temperature of the fuel cell is high. As a result, the cooling-liquid outlet temperature of the fuel cell is also high. Consequently, the fuel cell can be kept appropriately at a high temperature, thereby making the flooding difficult.

In particular, as the output of the fuel cell is larger, the heat generation thereof becomes larger, whereby the temperature of the cooling-liquid that bypasses the thermostat is also elevated. So that, this embodiment can provide such a characteristic that the temperature of the cooling-liquid that is supplied to the fuel cell elevates as the output of the fuel cell becomes larger. Therefore, also in a cooling system using a thermostat, a system could be established, which has such a characteristic of actively elevating the temperature of the cooling-water supplied to the fuel cell in response to the amount of the generated water that increases in accordance with a requested output.

Figure 19:
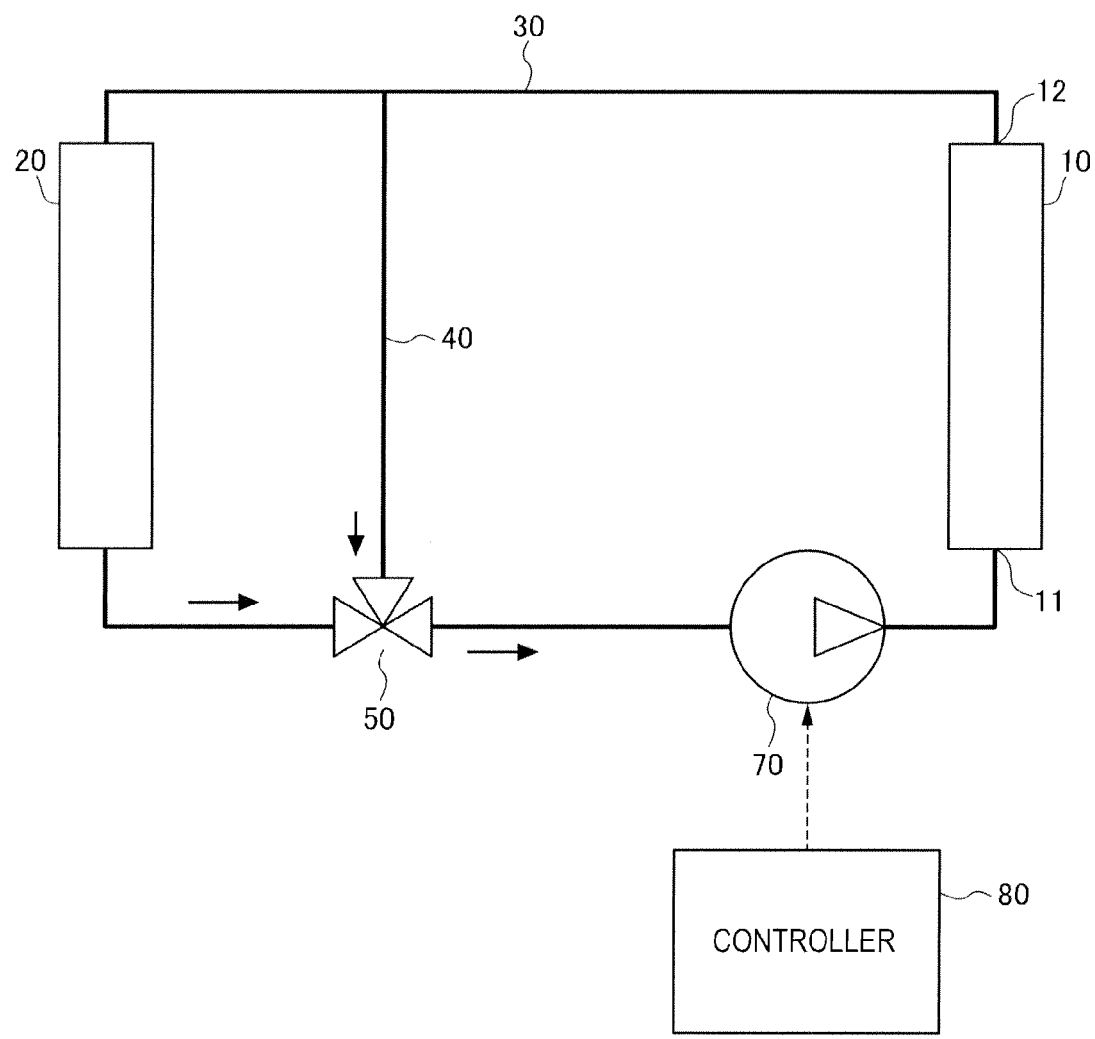
FIG. 19 is a drawing showing a reference embodiment.

In addition, even in the reference embodiment of FIG. 19, an inlet and outlet averaged temperature of the cooling-liquid for the fuel cell can be elevated by elevating the outlet temperature of the cooling-liquid for the fuel cell through lowering the rotation speed of the cooling-liquid pump. However, according to this embodiment, the inlet temperature of the cooling-liquid for the fuel cell becomes higher, so that, as compared with the reference embodiment, a difference in temperature relative to the outlet temperature of the cooling-liquid for the fuel cell becomes smaller, thereby leading to uniform temperature distributions at the inlet and outlet of the fuel cell become uniform; and as a result, variation in the electric power generation within the cells can be suppressed.

Note that, in this embodiment, the bypass flow-channel 60 is disposed in the housing 51 of the thermostat valve 50. This configuration allows a whole system to be assembled in compact thereby making installation thereof on a vehicle easy. Note that, the bypass flow-channel 60 may not be formed in the housing 51. The bypass flow-channel 60 may be a piping that connects together the radiator bypass flow-channel 40 and the cooling-liquid circulation flow-channel 30.

Second Embodiment

Figure 4A:
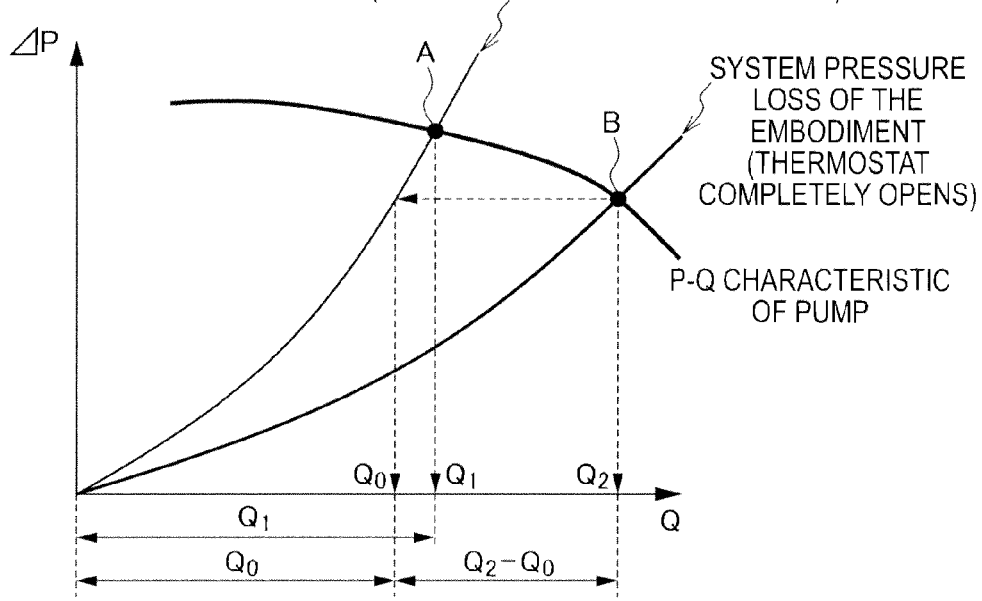
FIG. 4A is a drawing explaining a second embodiment of the system for adjusting temperature of cooling-liquid for a fuel cell, according to the present invention.
Figure 4B:
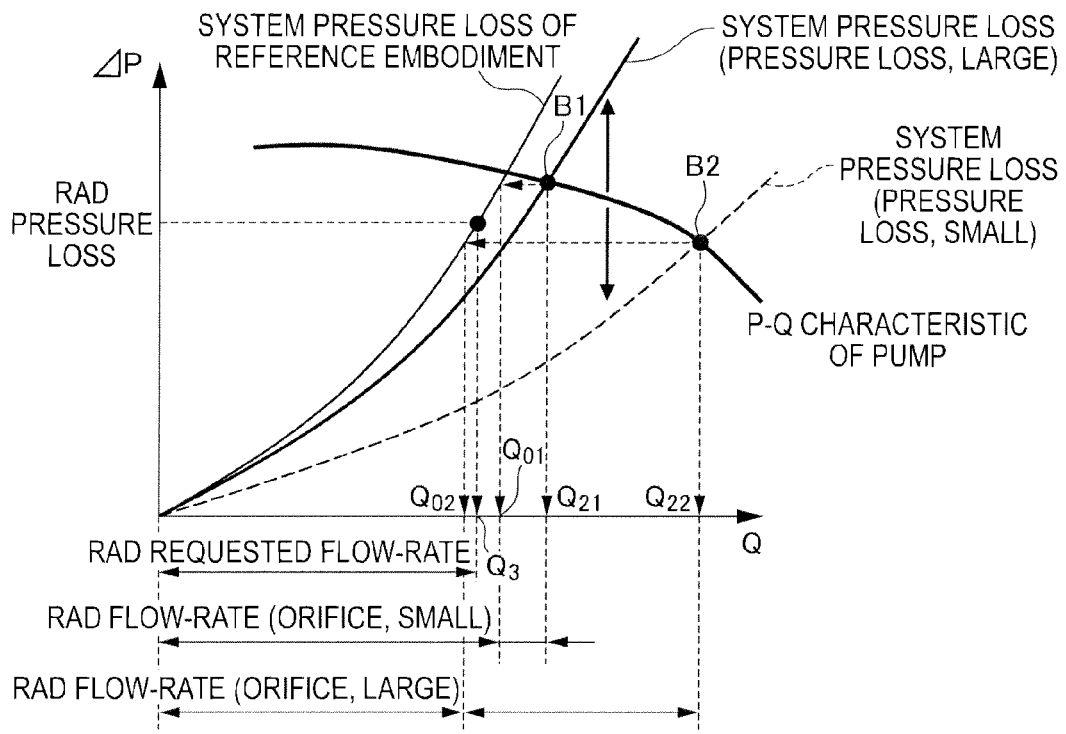
FIG. 4B is a drawing explaining a second embodiment of the system for adjusting temperature of cooling-liquid for a fuel cell, according to the present invention.

FIG. 4A and FIG. 4B are drawings showing a second embodiment of the system for adjusting temperature of cooling-liquid for a fuel cell according to the present invention.

As described above, by disposing the bypass flow-channel 60, the cooling-liquid temperature can be elevated higher. However, when a pressure loss is too small because of large diameter of the bypass flow-channel 60 or other reasons, the flow-rate for flowing into the radiator 20 might become insufficient. Therefore, the bypass flow-channel 60 is required to have a large pressure loss to some extent. Here, a specific method of setting up a pressure loss is described.

At first, a way to read a ΔP-Q characteristic chart is described with reference to FIG. 4A.

An upward-sloping thin line in FIG. 4A shows a relation between a flow-rate Q of the cooling-liquid that flows through the cooling-liquid circulation flow-channel 30 when the thermostat valve 50 is in a fully opened state in the reference embodiment (FIG. 19) and a pressure loss ΔP at that time. Note that, the fully opened state of the thermostat valve 50 is referred to a state in which all of the cooling-liquid that flows through the cooling-liquid circulation flow-channel 30 flows through the radiator 20 and does not flow in the radiator bypass flow-channel 40. The thin line in FIG. 4A shows that the pressure loss ΔP is larger as the flow-rate Q of the cooling-liquid is larger.

A downward-sloping line in FIG. 4A is a PQ characteristic line showing a correlation between a pump pressure P of a cooling-liquid pump 70 and an ejection flow-rate Q.

An intersection A of these two lines is an operating point of the cooling-liquid pump 70.

Hence, in the case of the reference embodiment (FIG. 19), when the thermostat valve 50 is fully opened and all of the cooling-liquid that flows through the cooling-liquid circulation flow-channel 30 flows through the radiator 20, the flow-rate of the cooling-liquid that is ejected out of the cooling-liquid pump 70 is represented as Q1.

An upward-sloping thick line in FIG. 4A shows a relation between a flow-rate Q of the cooling-liquid that flows through the cooling-liquid circulation flow-channel 30 when the thermostat valve 50 is fully opened in the embodiment (FIG. 1) and a pressure loss ΔP at that time. The thermostat valve 50 is fully opened, so that no cooling-liquid flows through the thermostat valve 50 from the radiator bypass flow-channel 40. As the valve bypass flow-channel 60 is disposed herein, the pressure loss is small even at the same flow-rate as in the reference embodiment.

An intersection B between the thick line and the PQ characteristic line of the cooling-liquid pump 70 is an operating point of the cooling-liquid pump 70.

Therefore, in the case of the embodiment (FIG. 1), the flow-rate of the cooling-liquid ejected out of the cooling-liquid pump 70 is Q2. A part of Q2 flows through the radiator 20, and the rest of it flows through the valve bypass flow-channel 60. Regarding this, the following considerations are feasible.

In a characteristic line of pressure loss in the absence of the valve bypass flow-channel 60, the flow-rate Q0 at the time when the pressure loss is the same as the operating point B of the cooling-liquid pump 70 corresponds to a flow-rate for flowing through the radiator 20. The rest (Q2−Q0) corresponds to a flow-rate for flowing through the valve bypass flow-channel 60.

Considering the above, a specific method of setting up the pressure loss of the valve bypass flow-channel 60 is described with reference to FIG. 4B.

Considerations are directed to an occasion in which the cooling-liquid with a flow-rate Q3 is required to be flown through the radiator 20 in order to satisfy a cooling performance requested for the fuel cell.

As the pressure loss of the valve bypass flow-channel 60 is larger (for example, as the flow-channel diameter of the valve bypass flow-channel 60 is smaller, or an open mouth diameter of an orifice attached to the valve bypass flow-channel 60 is smaller), the characteristic line of the reference embodiment without the valve bypass flow-channel 60 comes closer.

As the pressure loss of the valve bypass flow-channel 60 is smaller (for example, as the flow-channel diameter of the valve bypass flow-channel 60 is larger, or an open mouth diameter of an orifice attached to the valve bypass flow-channel 60 is larger), the characteristic line of the reference embodiment without the valve bypass flow-channel 60 departs away.

The operating point of the cooling-liquid pump 70 when the pressure loss is large is B1. At this time, the flow-rate of the cooling-liquid that is ejected out of the cooling-liquid pump 70 is designated as Q21. Of this, the flow-rate Q01 flows through the radiator 20. The rest (Q21−Q01) of it flows through the valve bypass flow-channel 60. The flow-rate Q01 is larger than the flow-rate Q3, so that, in this case, it is actually attainable that the flow-rate Q3 is made to flow through the radiator 20.

The operating point of the cooling-liquid pump 70 when the pressure loss is small is B2. At this time, the flow-rate of the cooling-liquid that is ejected out of the cooling-liquid pump 70 is Q22. Of this, the flow-rate Q02 flows through the radiator 20. The rest (Q22−Q02) of it flows through the valve bypass flow-channel 60. The flow-rate Q01 is smaller than the flow-rate Q3, so that, in this case, to flow through the radiator 20 with the flow rate Q3 is impossible to be realized.

In accordance with the foregoing principle, the flow-channel maximum diameter of the valve bypass flow-channel 60 (in the case of attaching an orifice to the bypass flow-channel 60, the open mouth diameter of the orifice) is determined in a manner that the pressure loss of the valve bypass flow-channel 60 does not become too small.

According to the present embodiment, a flow-rate of the cooling-liquid, which is required to flow through the radiator 20 in order to satisfy the cooling performance requested for the fuel cell, can be secured.

Third Embodiment

Figure 5:
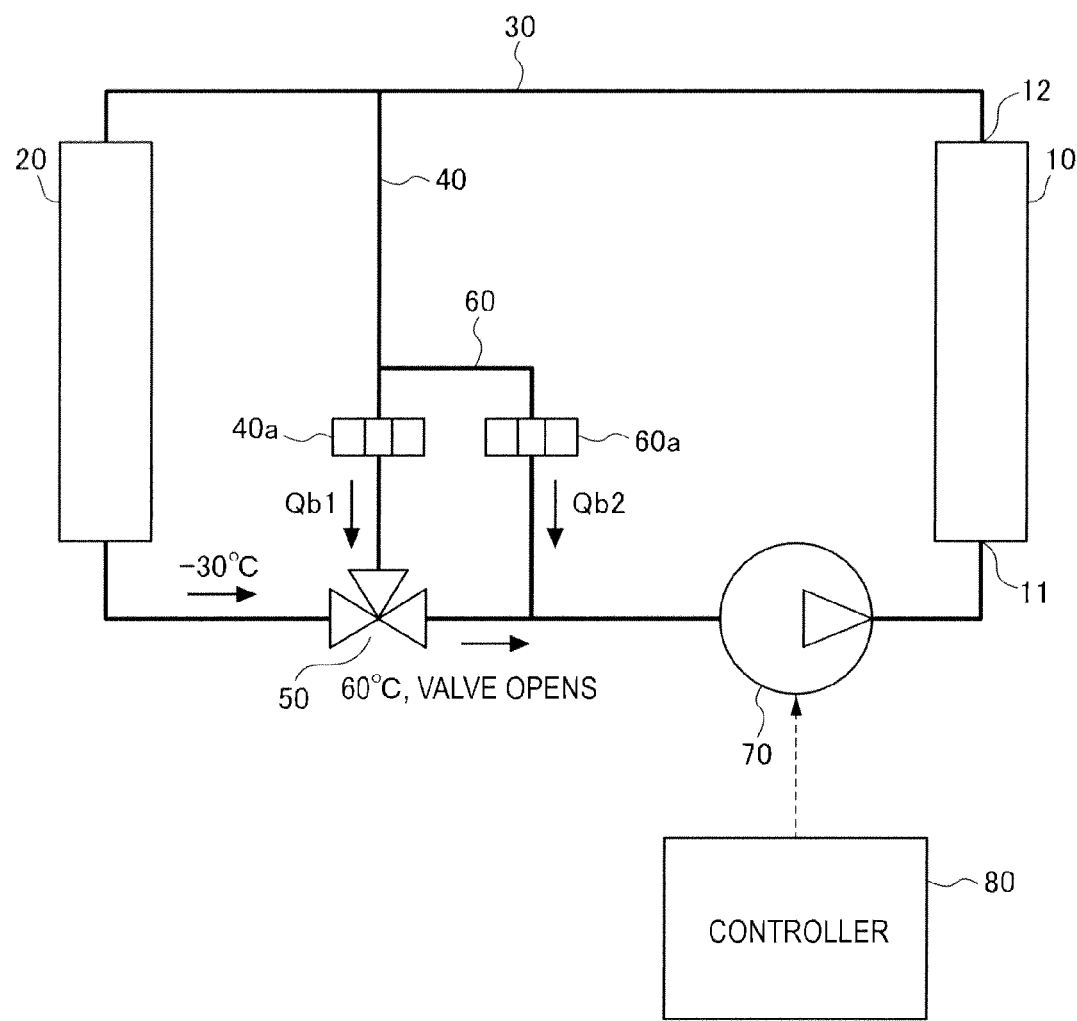
FIG. 5 is a drawing showing a third embodiment of the system for adjusting temperature of cooling-liquid for a fuel cell, according to the present invention.

FIG. 5 is a drawing showing a third embodiment of the system for adjusting temperature of cooling-liquid for a fuel cell according to the present invention.

As described above, the fuel cell generates much more water as the output thereof is larger. When the resultant water remains inside of the fuel cell, flooding might occur. And so, it is desirable to promote vaporization of the generated water by elevating the temperature of the fuel cell through elevation of the cooling-liquid temperature as the output is larger. The generated water had better being vaporized, because the water can be easily discharged to the outside together with the cathode gas.

And so, as described above, the valve bypass flow-channel 60 is disposed. In the followings, a method of setting up a pressure loss characteristic of the valve bypass flow-channel so as to actualize the above is described.

An occasion in which conditions become severest is a time when the water-temperature of the cooling-liquid at the outlet of the radiator is the lowest and the output of the fuel cell is maximum. Therefore, a target temperature of the cooling-liquid is made so as to be attainable under the above conditions. Specifically, a flow-rate ratio between a flow-rate Qb1 flowing through the radiator bypass flow-channel 40 and flowing into the thermostat valve 50 and a flow-rate Qb2 flowing through the valve bypass flow-channel 60 is selected as follows. Note that, in FIG. 5, orifices 40a and 60b that adjust the flow-rates Qb1 and Qb2 respectively are schematically drawn. However, the diameters themselves of the flow-channels may be adjusted.

[mathematic 1]

$$\frac{Qb2}{Qb1} > \frac{Tsst - Tin}{Tsst - Tr} \times \left(\frac{mc}{H} \times (Tr - Tin) - 1\right) \quad (2)$$

wherein,
$T_{sst}$: Setup temperature of thermostat
$T_{in}$: Target water-temperature of fuel cell
$T_r$: Lower limit of radiator outlet temperature
m: Lower limit flow-rate of cooling-liquid pump
c: Specific heat of cooling-liquid (=0.06 kW/(L/min)/° C.)
H: Heat generation amount of fuel cell For example, when an acceptable upper limit temperature is 80° C., a heat generation amount of the fuel cell at a load that provides a target water-temperature of the fuel cell of 80° C. is 50 kW, a lower limit of the radiator outlet temperature is minus 30° C., a lower limit flow-rate of the cooling-liquid pump is 20 L/min, and a setup temperature of the thermostat is 60° C., the flow-rate ratio of Qb2/Qb1 is selected to be equal to or higher than 0.81.

Figure 6:
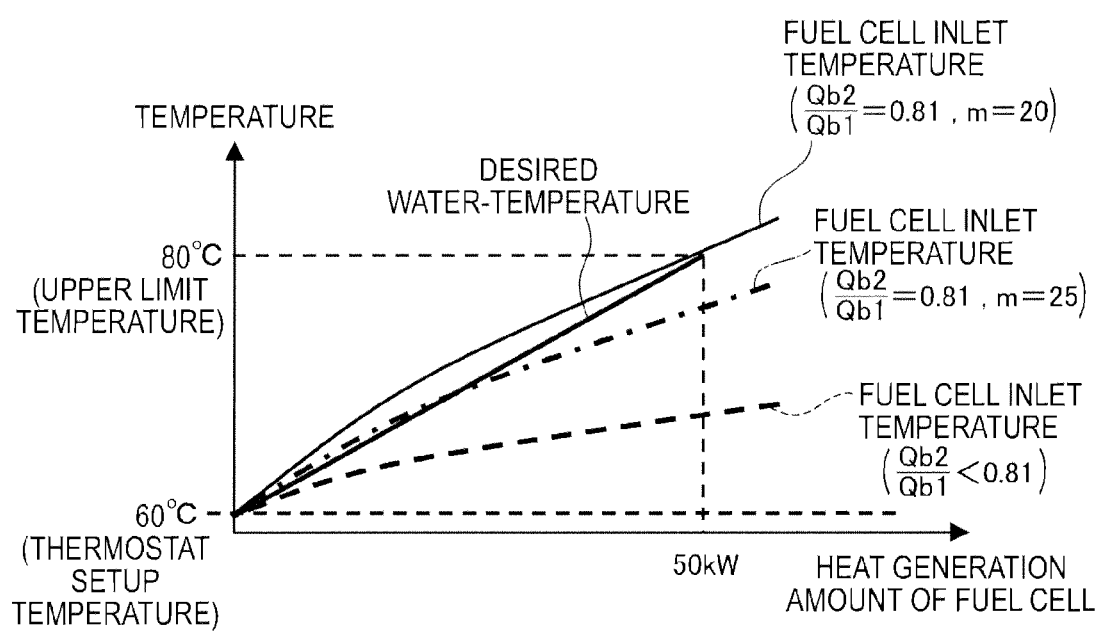
FIG. 6 is a drawing explaining a third embodiment of the system for adjusting temperature of cooling-liquid for a fuel cell, according to the present invention.

FIG. 6 is a drawing showing a third embodiment of the system for adjusting temperature of cooling-liquid for a fuel cell according to the present invention.

As described above, as the output of the fuel cell is larger, much more water is generated. If the water remains inside of the fuel cell, flooding might occur. As shown by a thick line in FIG. 6, it is desirable that the generated water is vaporized out by elevating the temperature of the cooling-liquid higher as the output is larger. And so, as described above, the valve bypass flow-channel 60 is disposed. At this time, as mentioned before, it is understood that, by selecting the flow-rate ratio of Qb2/Qb1 to be equal to or higher than 0.81, setting up can be made in a manner that a target water-temperature is attainable when the fuel cell is in a maximum output. In addition, in the other load areas, by increasing the flow-rate of the cooling-liquid pump thereby lowering the water-temperature in a manner as shown by the dashed-dotted line in FIG. 6, setting up at a target water-temperature can be made.

Fourth Embodiment

Figure 7A:
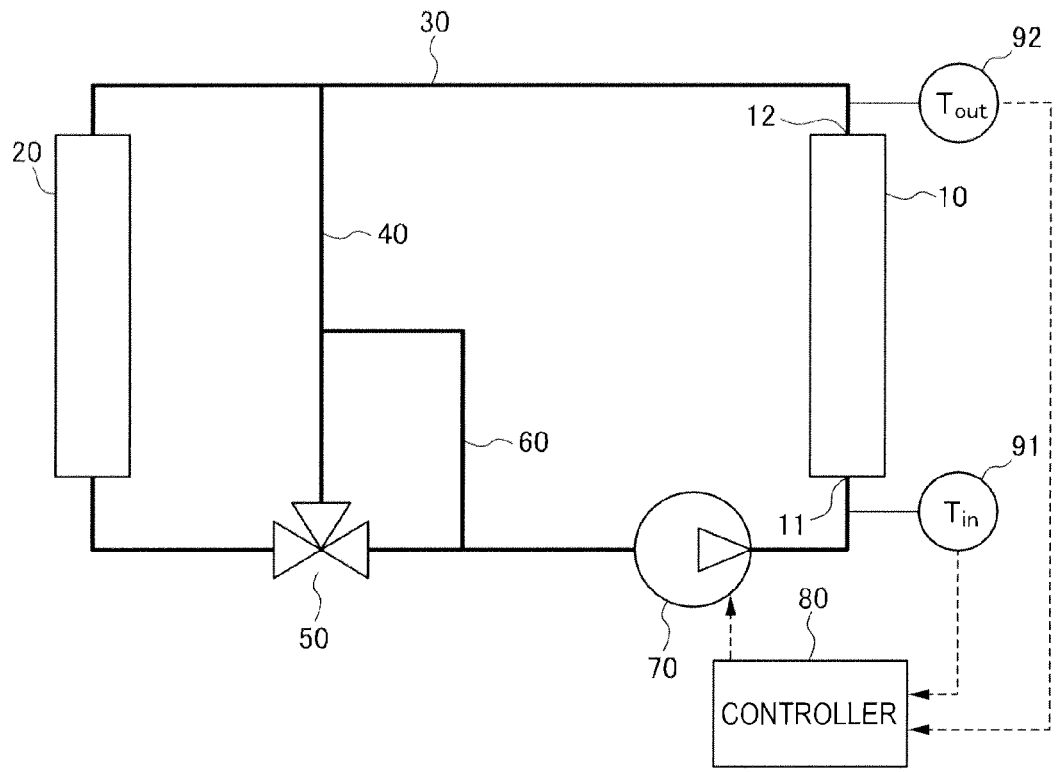
FIG. 7A is a drawing explaining a configuration of a fourth embodiment of the system for adjusting temperature of cooling-liquid for a fuel cell, according to the present invention.
Figure 7B:
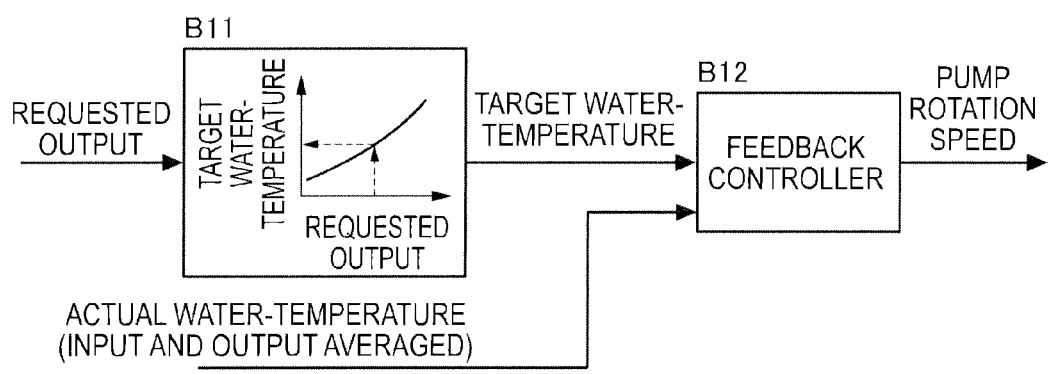
FIG. 7B is a drawing explaining a configuration of a fourth embodiment of the system for adjusting temperature of cooling-liquid for a fuel cell, according to the present invention.

FIG. 7A and FIG. 7B are drawings explaining a configuration of a fourth embodiment of the system for adjusting temperature of cooling-liquid for a fuel cell according to the present invention. FIG. 7A is a drawing of whole system. FIG. 7B is a control block diagram.

Note that, each block shown in the block diagram represents each function of the controller 80 as an imaginary unit. Each block has no meaning of physical existence.

As shown in FIG. 7A, in the system for adjusting cooling-liquid temperature for a fuel cell according to the fourth embodiment, an inlet temperature sensor 91 is disposed nearby a cooling-liquid inlet 11 of the fuel cell 10. In addition, an outlet temperature sensor 92 is disposed nearby a cooling-liquid outlet 12 of the fuel cell 10.

As shown in FIG. 7B, the controller 80 sets up a target water-temperature in response to a requested output. Then, corresponding to a deviation between the target water-temperature and an actual water-temperature of the fuel cell, the rotation speed of the cooling-liquid pump 70 is adjusted.

Note that, the actual water-temperature of the fuel cell is an average value of the inflowing cooling-liquid temperature that is detected by the inlet temperature sensor 91 and the outflowing cooling-liquid temperature that is detected by the outlet temperature sensor 92.

Figure 8A:
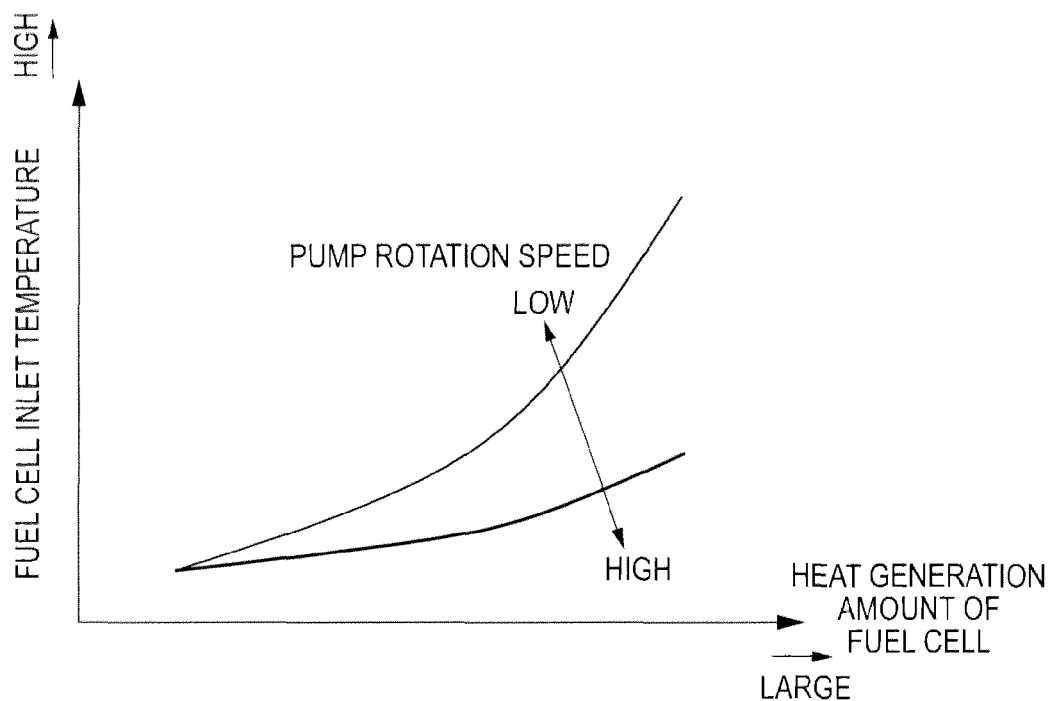
FIG. 8A is a drawing explaining a fourth embodiment of the system for adjusting temperature of cooling-liquid for a fuel cell, according to the present invention.
Figure 8B:
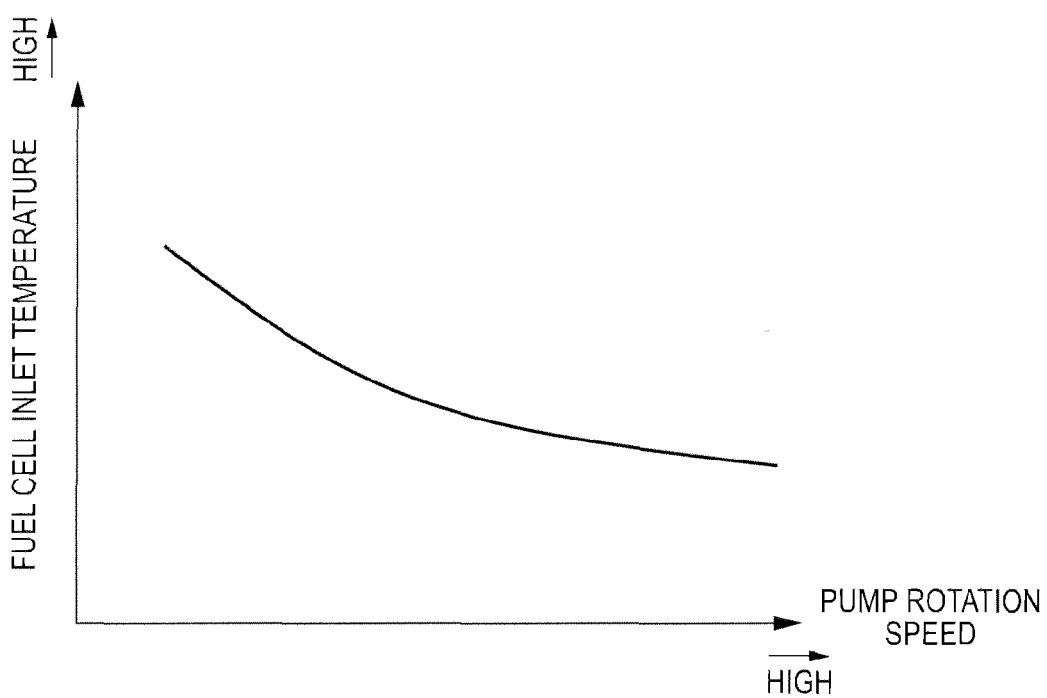
FIG. 8B is a drawing explaining a fourth embodiment of the system for adjusting temperature of cooling-liquid for a fuel cell, according to the present invention.

FIG. 8A and FIG. 8B are drawings explaining a fourth embodiment of the system for adjusting temperature of cooling-liquid for a fuel cell according to the present invention.

The thin line in FIG. 8A shows a correlation between the heat generation amount of the fuel cell and the inlet temperature of the cooling-liquid when the rotation speed of the cooling-liquid pump 70 is small. The thick line in FIG. 8A shows a correlation between the heat generation amount of the fuel cell and the inlet temperature of the cooling-liquid when the rotation speed of the cooling-liquid pump 70 is large. As is clear from the above, when the heat generation amount of the fuel cell is the same, the inlet temperature of the fuel cell becomes higher at the time when the rotation speed of the cooling-liquid pump 70 is smaller. The reason for the above is that the amount of heat of the cooling-water that flows into the valve bypass channel 60 becomes larger as the rotation speed of the cooling-liquid pump 70 is smaller.

By executing the control according to this embodiment, as shown in FIG. 8B, as the rotation speed of the cooling-liquid pump 70 is lower, the inlet temperature of the fuel cell can be made higher. Therefore, when the actual water-temperature of the fuel cell is lower relative to the target water-temperature, the rotation speed of the cooling-liquid pump 70 is made lower as the deviation is larger. When the actual water-temperature of the fuel cell is larger relative to the target water-temperature, the rotation speed of the cooling-liquid pump 70 is made higher as the deviation is larger.

In this way, by additionally controlling the rotation speed of the cooling-liquid pump 70, the temperature of the cooling-liquid can be adjusted more accurately, thereby allowing the fuel cell be operated under adequate wet conditions.

Note that, in this embodiment, a control such as an anti-windup is added to a feedback controller, if necessarily.

Fifth Embodiment

Figure 9A:
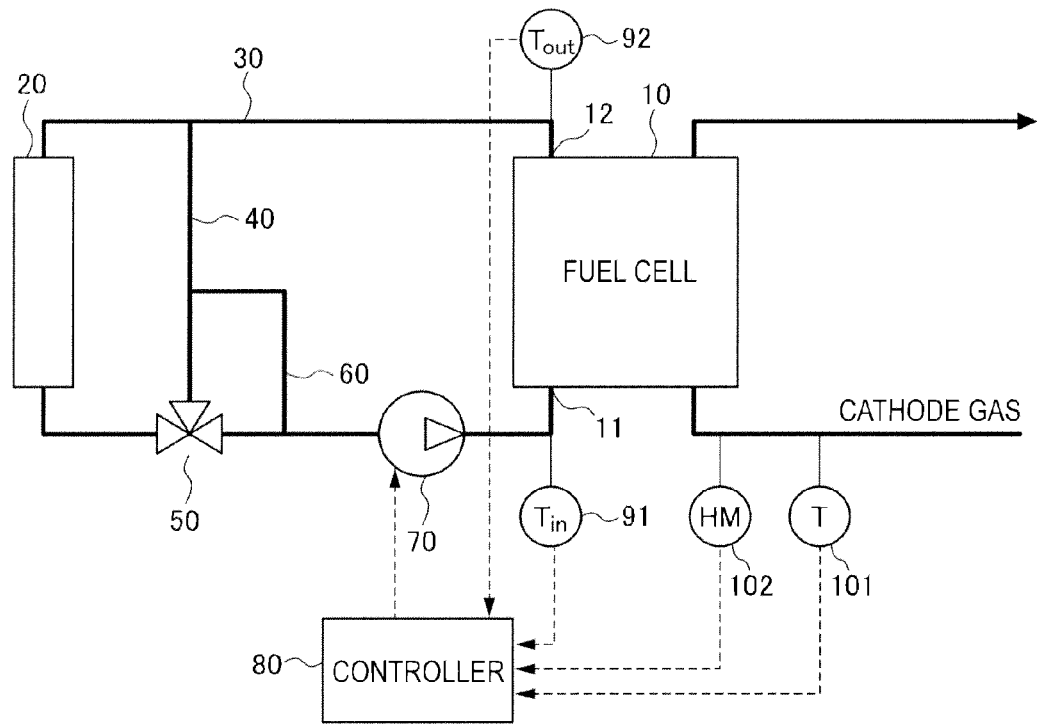
FIG. 9A is a drawing explaining a configuration of a fifth embodiment of the system for adjusting temperature of cooling-liquid for a fuel cell, according to the present invention.
Figure 9B:
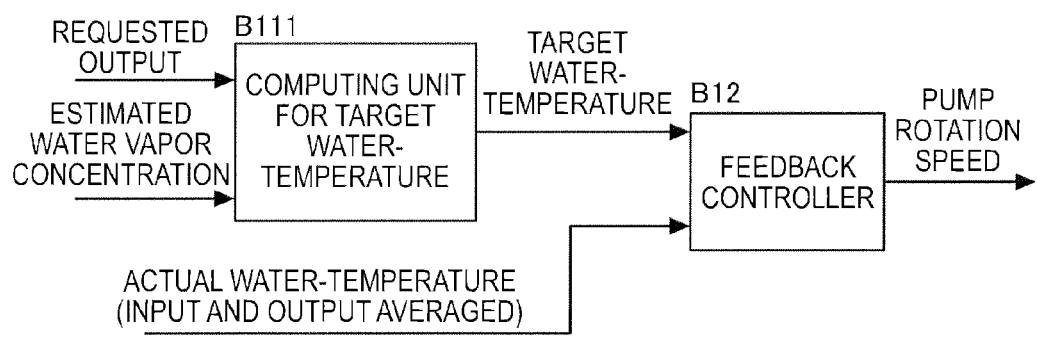
FIG. 9B is a drawing explaining a configuration of a fifth embodiment of the system for adjusting temperature of cooling-liquid for a fuel cell, according to the present invention.

FIG. 9A and FIG. 9B are drawings explaining a configuration of a fifth embodiment of the system for adjusting temperature of cooling-liquid for a fuel cell according to the present invention. FIG. 9A is a drawing of whole system. FIG. 9B a control block diagram.

In the fifth embodiment, as compared with the fourth embodiment, a sensor 101 that detects the temperature of the cathode gas (intake air) and a sensor 102 that detect relative humidity are further included.

Figure 10:
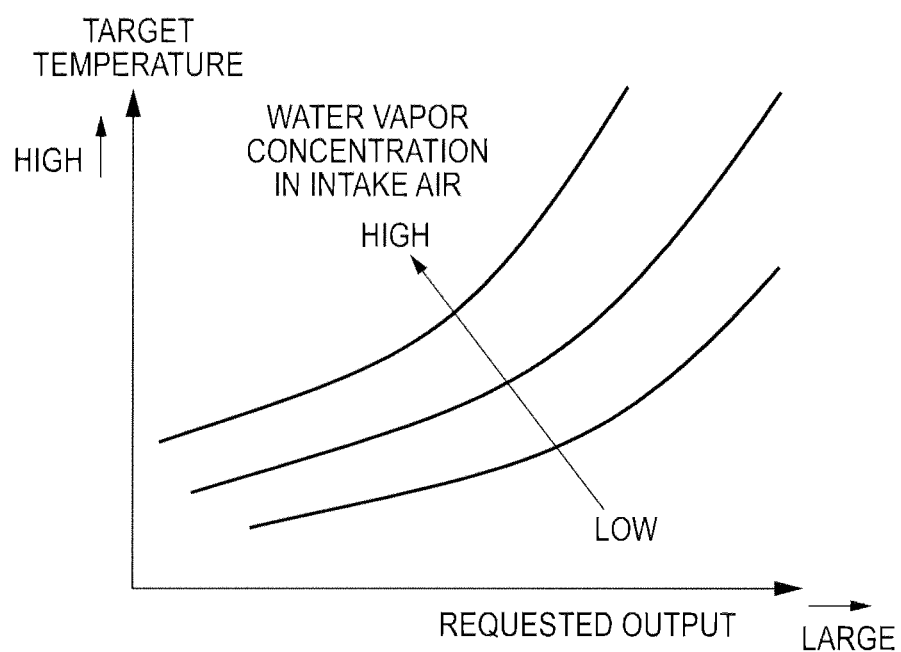
FIG. 10 is a drawing showing an example of a map for setting up a target temperature of cooling-liquid.

And, the controller 80 estimates a water vapor concentration in the cathode gas (intake air) from the temperature and an estimated relative humidity of the cathode gas (intake air). And, considering also the estimated water vapor concentration, the target temperature of the cooling-liquid is selected. Specifically, the target temperature is selected based on a map that is preliminary determined as FIG. 10 through experiments and the like.

The present embodiment is configured in a manner that the target water-temperature is elevated when the humidity of intake air is high. Therefore, a still more precise control attainable, and the generated water is not easy to remain inside of the fuel cell. Whereby, flooding is still more easily prevented, so that the fuel cell can be operated under still more adequate wet conditions.

Sixth Embodiment

Figure 11A:
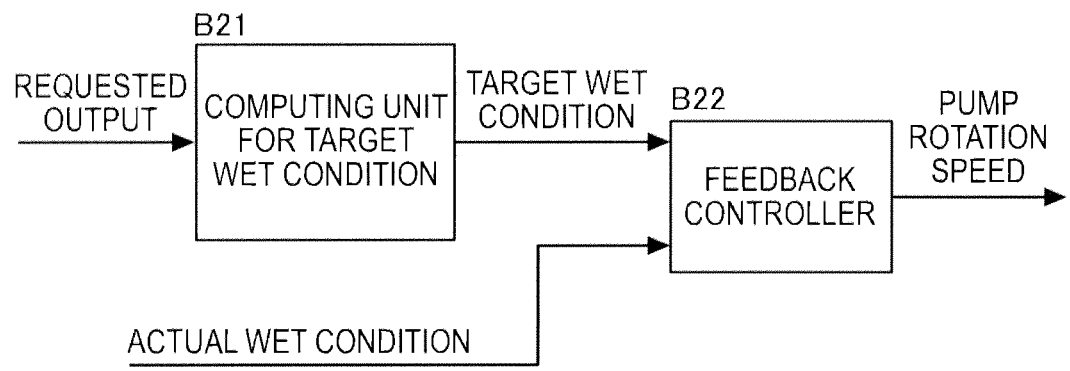
FIG. 11A is a drawing explaining a sixth embodiment of the system for adjusting temperature of cooling-liquid for a fuel cell, according to the present invention.
Figure 11B:
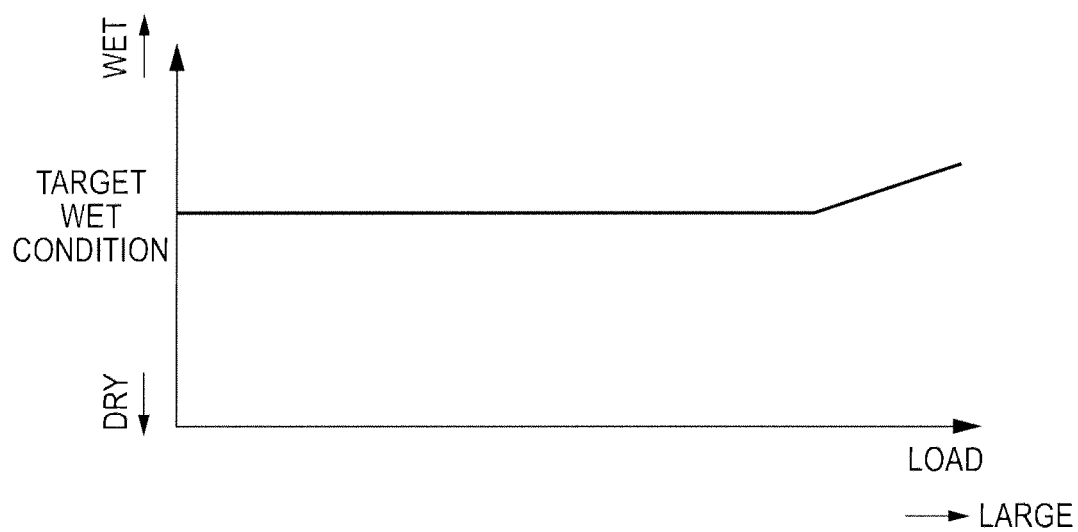
FIG. 11B is a drawing explaining a sixth embodiment of the system for adjusting temperature of cooling-liquid for a fuel cell, according to the present invention.

FIG. 11A and FIG. 11B are drawings explaining a sixth embodiment of the system for adjusting temperature of cooling-liquid for a fuel cell according to the present invention.

In this embodiment, as shown in FIG. 11A, the controller 80 selects a target wet condition of the fuel cell based on a requested output. Note that, the target wet condition has been determined based on a map that is preliminarily determined as in FIG. 11B through experiments and the like. The target wet condition is basically constant, but increases near a maximum load.

Furthermore, the controller 80 detects an actual wet condition. Detection of the actual wet condition may be attained by detecting the internal resistance of the fuel cell. Such a method is publicly known, so that the explanation thereof is omitted herein.

And then, in accordance with a deviation of the actual wet condition relative to the target wet condition, the rotation speed of the cooling-liquid pump 70 is adjusted.

In this way, by controlling the rotation speed of the cooling-liquid pump 70, the wet condition may be adjusted more precisely, thereby allowing the fuel cell be operated under adequate wet conditions.

Seventh Embodiment

Figure 12A:
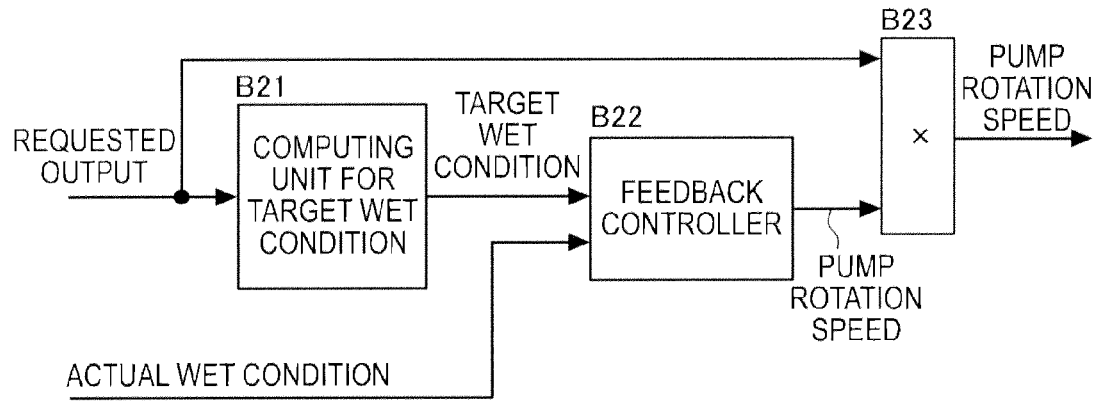
FIG. 12A is a drawing explaining a seventh embodiment of the system for adjusting temperature of cooling-liquid for a fuel cell, according to the present invention.
Figure 12B:
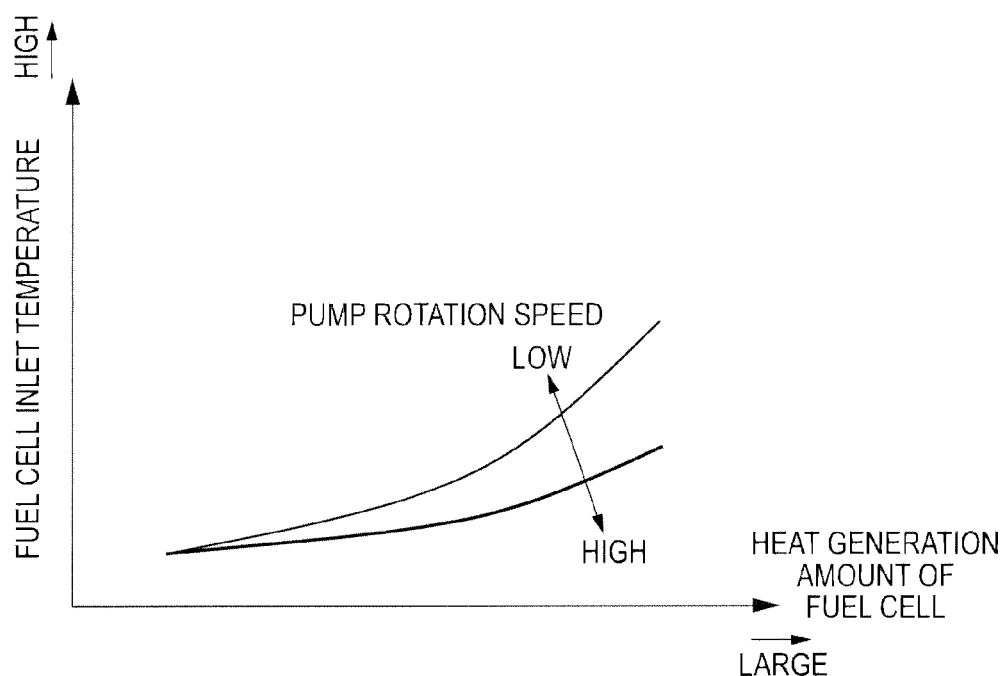
FIG. 12B is a drawing explaining a seventh embodiment of the system for adjusting temperature of cooling-liquid for a fuel cell, according to the present invention.

FIG. 12A and FIG. 12B are drawings explaining a seventh embodiment of the system for adjusting temperature of cooling-liquid for a fuel cell according to the present invention.

In the present embodiment, as compared with the sixth embodiment, the rotation speed of the cooling-liquid pump 70 is corrected in accordance with the requested output. Specifically, the controller 80 makes a larger correction for the rotation speed of the cooling-liquid pump 70 as the requested output is higher.

As shown in FIG. 12B, as the output of the fuel cell is larger, the temperature change in response to the output change is larger. That is, as the output of the fuel cell is larger, the elevation speed of the temperature is faster. As opposed to this, in this embodiment, as the requested output is higher, the rotation speed of the cooling-liquid pump 70 is made so as to give a larger correction. That is, a gain is made larger. By so doing, overshoot upon feedback control can be suppressed.

Eighth Embodiment

Figure 13A:
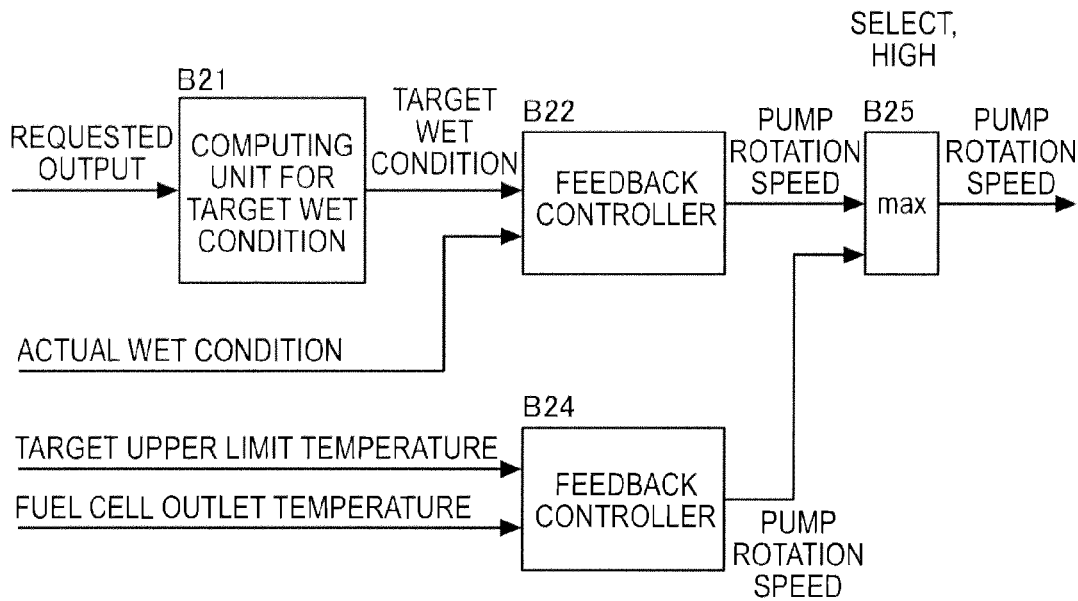
FIG. 13A is a drawing explaining an eighth embodiment of the system for adjusting temperature of cooling-liquid for a fuel cell, according to the present invention.
Figure 13B:
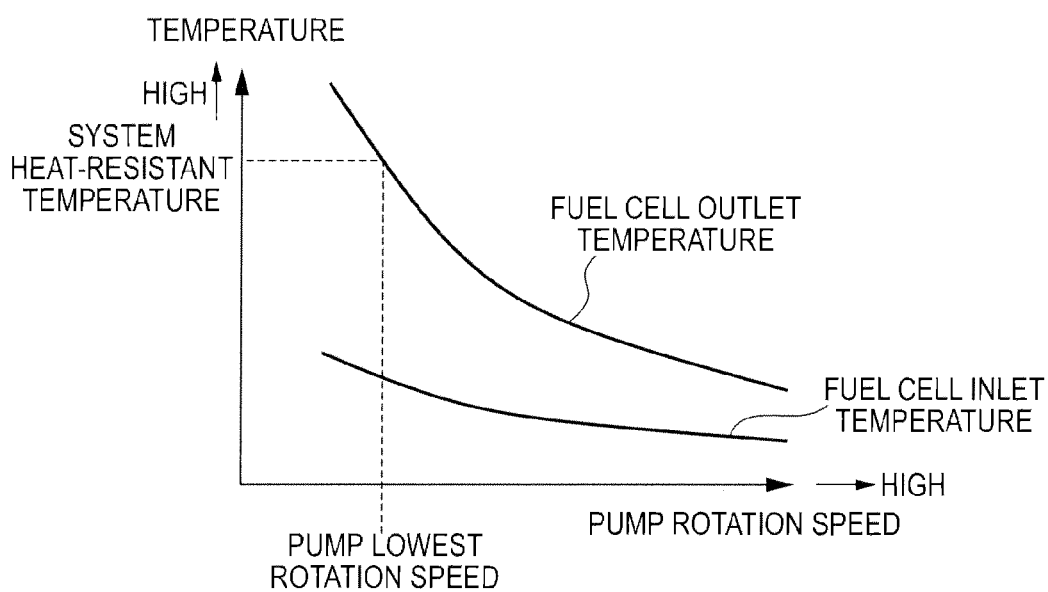
FIG. 13B is a drawing explaining an eighth embodiment of the system for adjusting temperature of cooling-liquid for a fuel cell, according to the present invention.

FIG. 13A and FIG. 13B are drawings explaining the system for adjusting temperature of cooling-liquid for a fuel cell according to the present invention.

In this embodiment, as compared with the sixth embodiment, a rotation speed lower limit of the cooling-liquid pump 70 is determined. Specifically, the controller 80 computes the rotation speed of the cooling-liquid pump 70 in accordance with a deviation between a target upper limit temperature that is determined by system's heat-resistant performance and others and the outlet temperature of the fuel cell. And then, when the rotation speed of the cooling-liquid pump 70 that is computed in the same manner as in the sixth embodiment is below the above computed rotation speed, this rotation speed is selected as the rotation speed of the cooling-liquid pump 70. If not below, the rotation speed computed in the same manner as in the sixth embodiment is selected as the rotation speed of the cooling-liquid pump 70.

As shown in FIG. 13B, when the rotation speed of the cooling-liquid pump 70 is small, the inlet temperature and the outlet temperature of the fuel cell elevate. In such a case, even if an adequate wet condition is attained by controlling as in the sixth embodiment, the system heat-resistant temperature might be possibly exceeded in some cases. As opposed to the above, by restricting the lower limit of the rotating speed of the cooling-liquid pump 70 as in this embodiment, elevation of the temperature above the system's heat-resistant temperature can be prevented.

Ninth Embodiment

In this embodiment, the other examples for the thermostat valve 50 that are used in the foregoing first embodiment to eighth embodiment are described.

Figure 14:
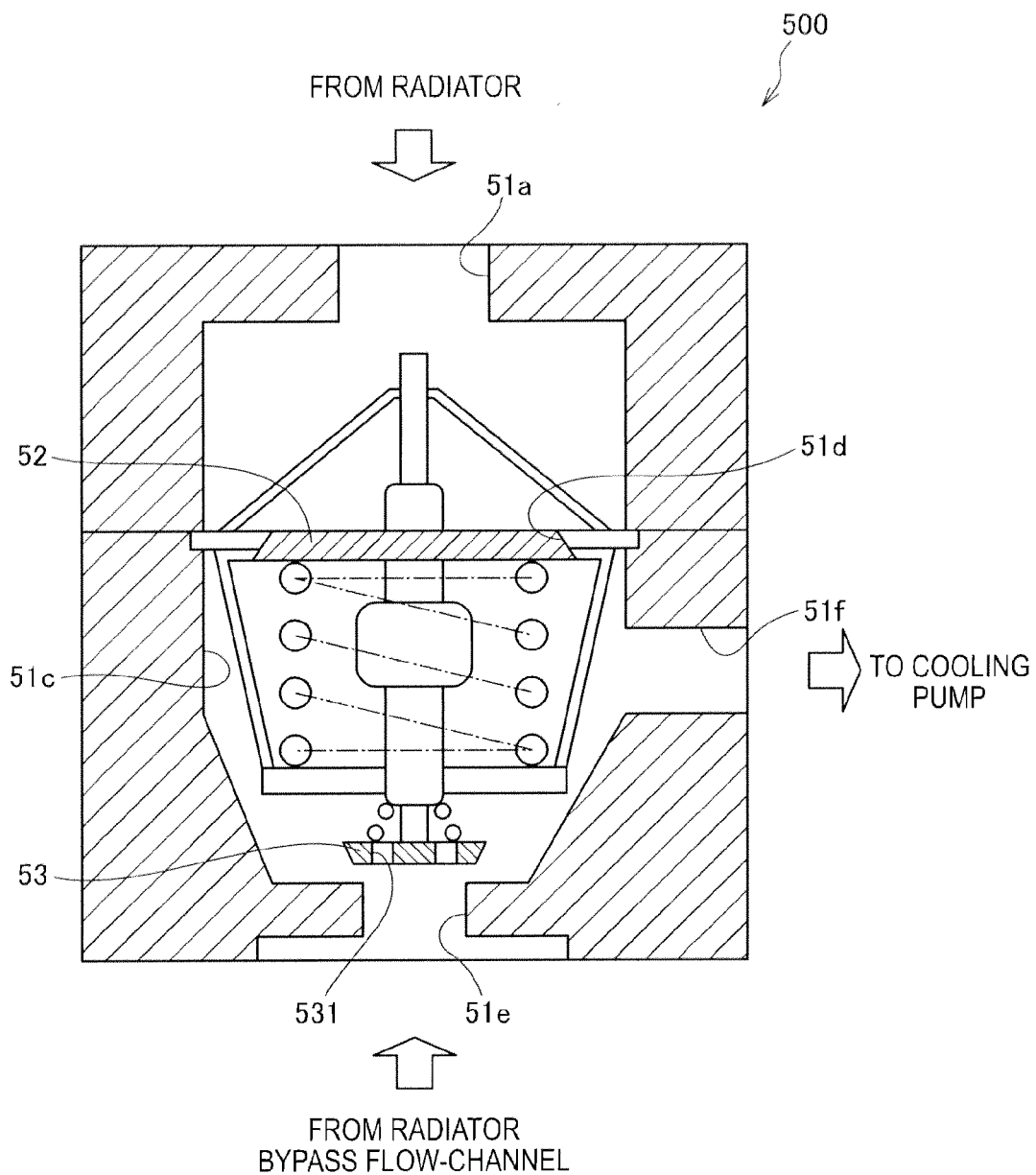
FIG. 14 is a cross-sectional drawing showing a structure of the thermostat valve according to the other embodiment of the present invention.

FIG. 14 is a cross-sectional drawing that shows a structure of a thermostat valve 500 according to this embodiment and a state in which a main valve 52 is closed and a bypass valve 53 is opened. A different point of the thermostat valve 500 according to the present embodiment from the thermostat valve 50 resides in that communication holes 531, which allow the intermediate temperature zone 51c and the open mouth 51e on the high temperature side to communicate with each other, are disposed in the bypass valve 53. Hereinafter, this different point is mainly explained. Note that, in the thermostat valve 500 according to the present embodiment, the same reference numerals and symbols are imparted to zones or units that serve the same functions as in the thermostat valve 50, and overlapping explanations are appropriately omitted.

As shown in FIG. 14, the thermostat valve 500 has communication holes 531 that allow the intermediate zone 51c and the open mouth 51e on the high temperature side to communicate with each other in the bypass valve 53. In this embodiment, a plurality of communication holes 531 are formed in the bypass valve 53, however, one hole may be allowed.

Figure 15:
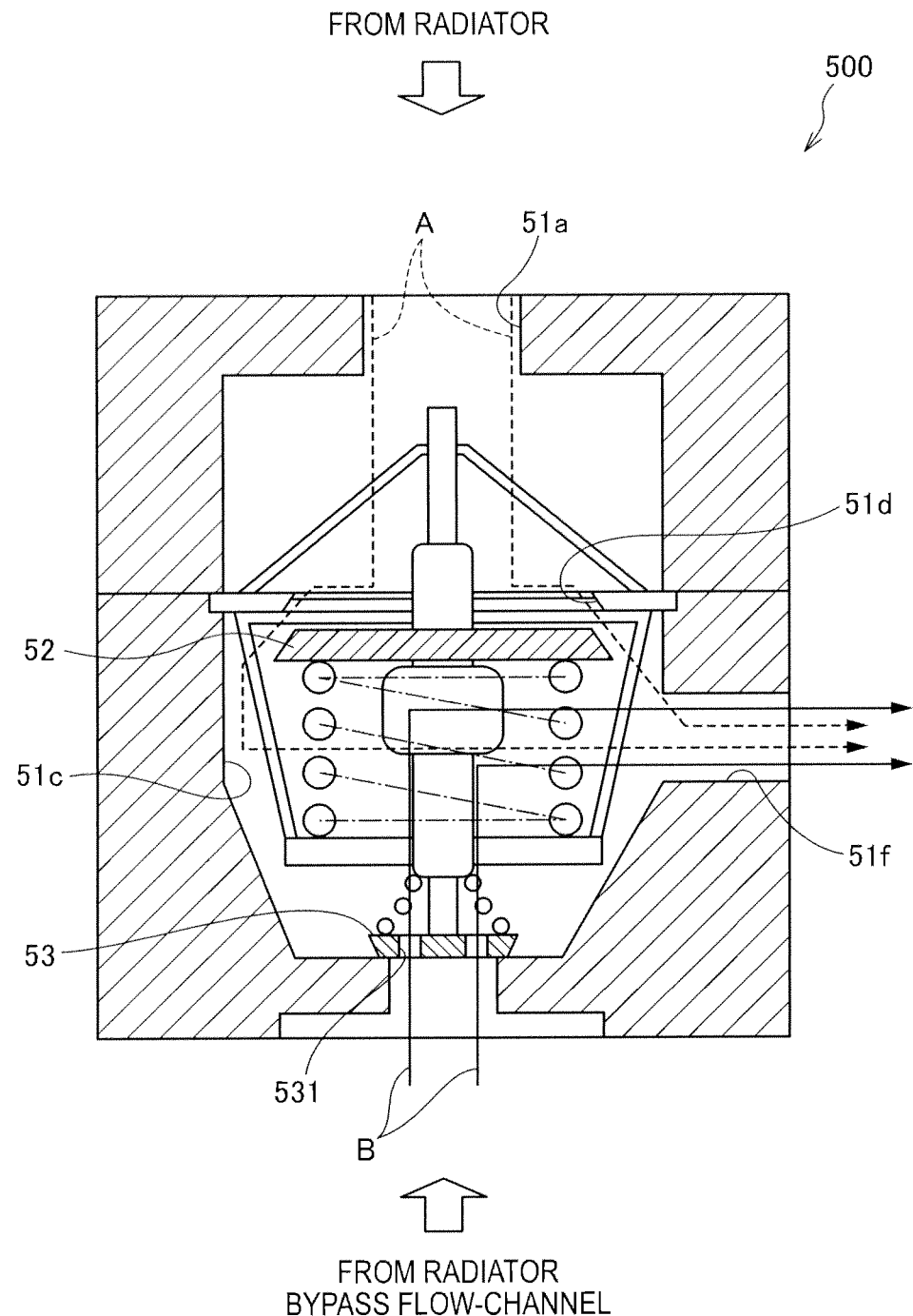
FIG. 15 is a drawing showing the thermostat valve according to the other embodiment, in the case of a main valve opened and a bypass valve closed.

Next, with reference to FIG. 15, action effects of the thermostat valve 500 are explained.

FIG. 15 is a drawing showing the thermostat valve 500 when the main valve 52 opens and the bypass valve 53 closes. In FIG. 15, an arrow A of a broken line shows a flow direction of a low temperature cooling-liquid, and an arrow B of a solid line shows a flow direction of a high temperature cooling-liquid.

As shown by the arrow A in FIG. 15, when the main valve 52 opens, the low temperature cooling-liquid flowing from the radiator 20 flows into the intermediate zone 51c through an aperture between the main valve 52 and the open mouth 51d on the low temperature side. The low temperature cooling-liquid that has flown into the intermediate temperature zone 51c is mixed with the high temperature cooling-liquid that has flown into the intermediate temperature zone 51c from the radiator bypass flow-channel 40 at the time when the bypass valve 53 opens, and then discharged through the flow-channel 51f.

Here, the thermostat valve 500 according to this embodiment has the communication holes 531 in the bypass valve 53. So that, as shown by the arrow B in FIG. 15, even after the bypass valve 53 closes, the high temperature cooling-liquid is flown into the intermediate zone 51c through the communication holes 531, mixed with the low temperature cooling-liquid that flows into the intermediate temperature zone 51*c* from the side of the low temperature zone 51*a*, and then discharged through the outflow-channel 51*f*.

The heat generation amount of the fuel cell 10 becomes larger as the output thereof is larger. So that, also the temperature of the cooling-liquid flowing out of the outlet 12 of the fuel cell 10 becomes higher. That is, the temperature of the high temperature cooling-liquid that flows into the intermediate temperature zone 51*c* from the communication holes 531 through the radiator bypass flow-channel 40 becomes higher, as the output of the fuel cell 10 is larger.

Therefore, as in this embodiment, the high temperature cooling-liquid whose temperature becomes higher as the output of the fuel cell is larger is made to flow into the intermediate temperature zone 51*c* through the communication holes 531, whereby the temperature of the cooling-liquid that is supplied to the fuel cell 10 can be elevated as the output of the fuel cell 10 becomes larger.

As a result, also in a cooling system where the thermostat 500 according to this embodiment is used, a system, which has a characteristic of actively elevating the temperature of the cooling-water supplied to the fuel cell 10 in response to the amount of the generated water that increases in accordance with an output requested, is attainable.

Furthermore, by disposing the communication holes 531 in the bypass valve 53, the following advantageous effects are attainable besides the aforementioned advantageous effect capable to elevate the temperature of the cooling-liquid that is supplied to the fuel cell 10 as the output of the fuel cell 10 becomes larger.

In the case of the conventional thermostat valve 50 that has been explained in the first embodiment with reference to FIG. 2, when the main valve 52 starts to open, while the low temperature cooling-liquid flows into the intermediate temperature zone 51*c*, the bypass valve 53 closes thereby stopping the flow into the intermediate temperature zone 51*c*.

Because of the above, an occurrence, in which the temperature of the cooling-liquid inside of the intermediate temperature zone 51*c* is lowered temporarily at the time when the main valve 52 opens and the main valve 52 that has opened closes again momentarily, is brought about repeatedly in some cases. When a hunting in which the valve 52 on the cool temperature side shuts and closes repeatedly is brought about as mentioned above, the temperature of the cooling-liquid inside the intermediate temperature zone 51*c* fluctuates up and down. Consequently, the temperature of the cooling-liquid that is discharged through the outflow-channel 51*f* also fluctuates up and down.

Any of the thermostat valve 50 that is explained in the first embodiment and the thermostat valve 500 according to this embodiment is required to have a function (hereinafter, called as "thermostat function") of keeping the temperature of the cooling-liquid discharged through the outflow-channel 51*f* at a desired temperature. So, it is not desirable that the temperature of the cooling-liquid discharged through the outflow-channel 51*f* fluctuates up and down. In addition, the hunting of the valve 52 on the cool temperature side leads to degradation of the valve 52 on the cool temperature side and the bypass valve 53, so that it is also not desirable in terms of durability.

As described above, as in the first embodiment, the conventional thermostat valve 50, which has the bypass flow-channel simply allowing the high temperature zone 51*b* and the outflow-channel 51*f* to be connected with each other, is easy to lower in the thermostat function thereof at the time when the main valve 52 opens. In addition, the durability of the thermostat valve 50 itself is easily degraded.

As opposed to the above, the thermostat valve 500 according to this embodiment allows the high temperature cooling-liquid, which is made to join to the outflow-channel 51*f* through the bypass flow-channel 60 in the first embodiment, to join to the outflow channel 51*f* at the time when the main valve 52 opens (that is, at the time when the bypass valve 53 closes) after the high temperature cooling-liquid flows into the intermediate temperature zone 51*c* through the communication holes 531 of the bypass valve 53.

By so doing, at the time when the main valve 52 opens, even if the low temperature cooling-liquid flows into the intermediate temperature zone 51*c*, by means of the high temperature cooling-liquid that flows into the intermediate temperature zone 51*c* through the communication holes 531 of the bypass valve 53, lowering of the temperature of the cooling-liquid inside of the intermediate temperature zone 51*c* can be suppressed.

Because of the above, the hunting of the valve 52 on the cool temperature side is suppressed, so that the thermostat function and durability of the thermostat valve 500 can be enhanced.

The embodiments of the present invention are described above, but they are only a part of application examples of the present invention; and thus, the technical scope of the present invention is by no means limited to the specific configurations of the embodiments.

Figure 16:
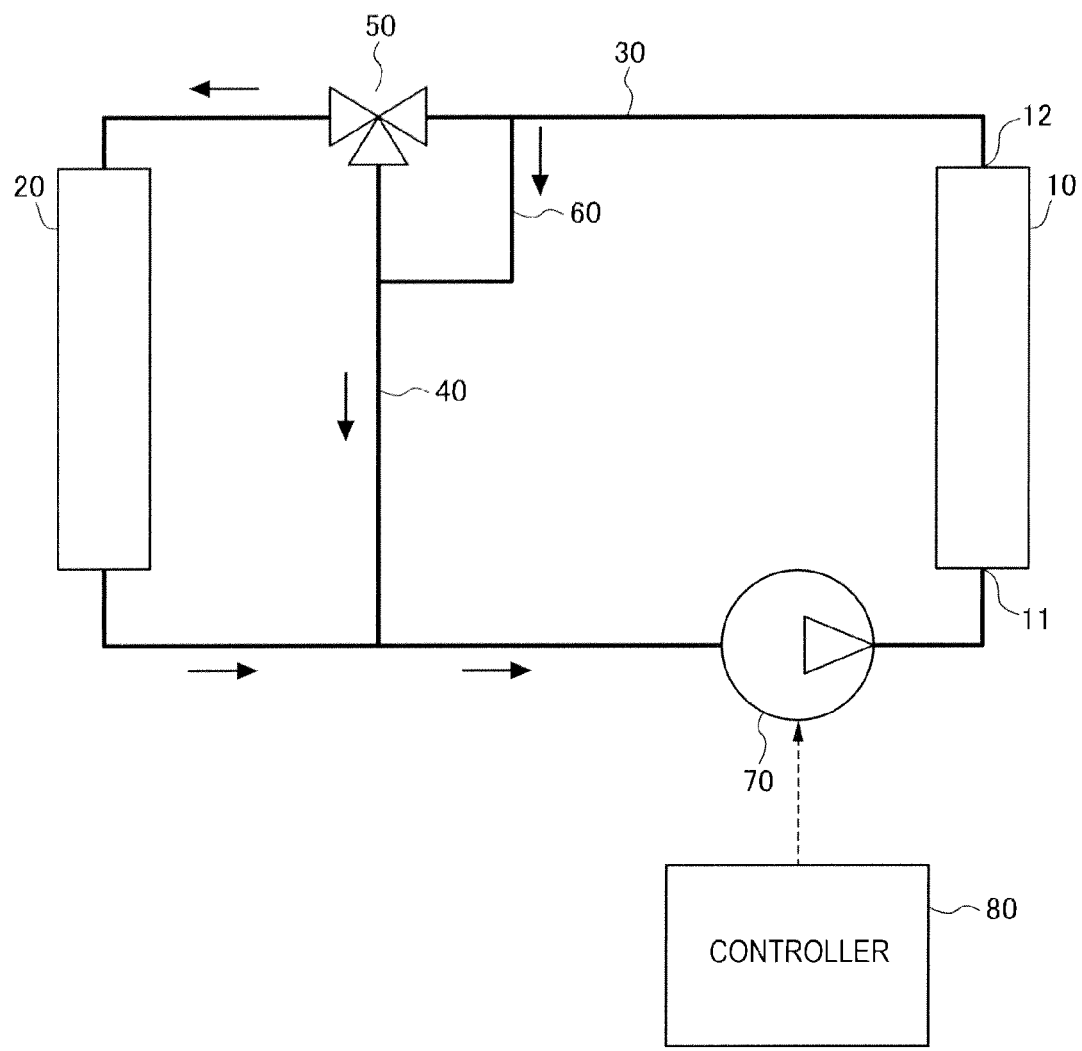
FIG. 16 is a drawing showing the other embodiment of the system for adjusting temperature of cooling-liquid for a fuel cell, according to the present invention.

For example, in the above embodiments, the thermostat valve 50 is disposed at a junction where the cooling-liquid that flows through the cooling-liquid circulation flow-channel 30 and the cooling-liquid that flows through the radiator bypass flow-channel 40 join together. However, this is not limitative. As shown in FIG. 16, the thermostat valve 50 may be disposed at a branched position where a part of the cooling-liquid that flows through the cooling-liquid circulation flow-channel 30 is branched into the radiator bypass flow-channel 40. And, the valve bypass flow-channel 60 may connect the cooling-liquid circulation flow-channel 30 and the radiator bypass flow-channel 40 together, so that the cooling-liquid bypasses the thermostat valve 50.

Even in the above configuration, the same action effects are attainable.

Furthermore, in the first embodiment, the bypass flow-channel 60 is formed in the housing 51 of the thermostat valve 50, but it may not be formed in the housing 51. The bypass flow-channel 60 may be a piping that connects together the radiator bypass flow-channel 40 and the cooling-liquid circulation flow-channel 30.

Figure 17:
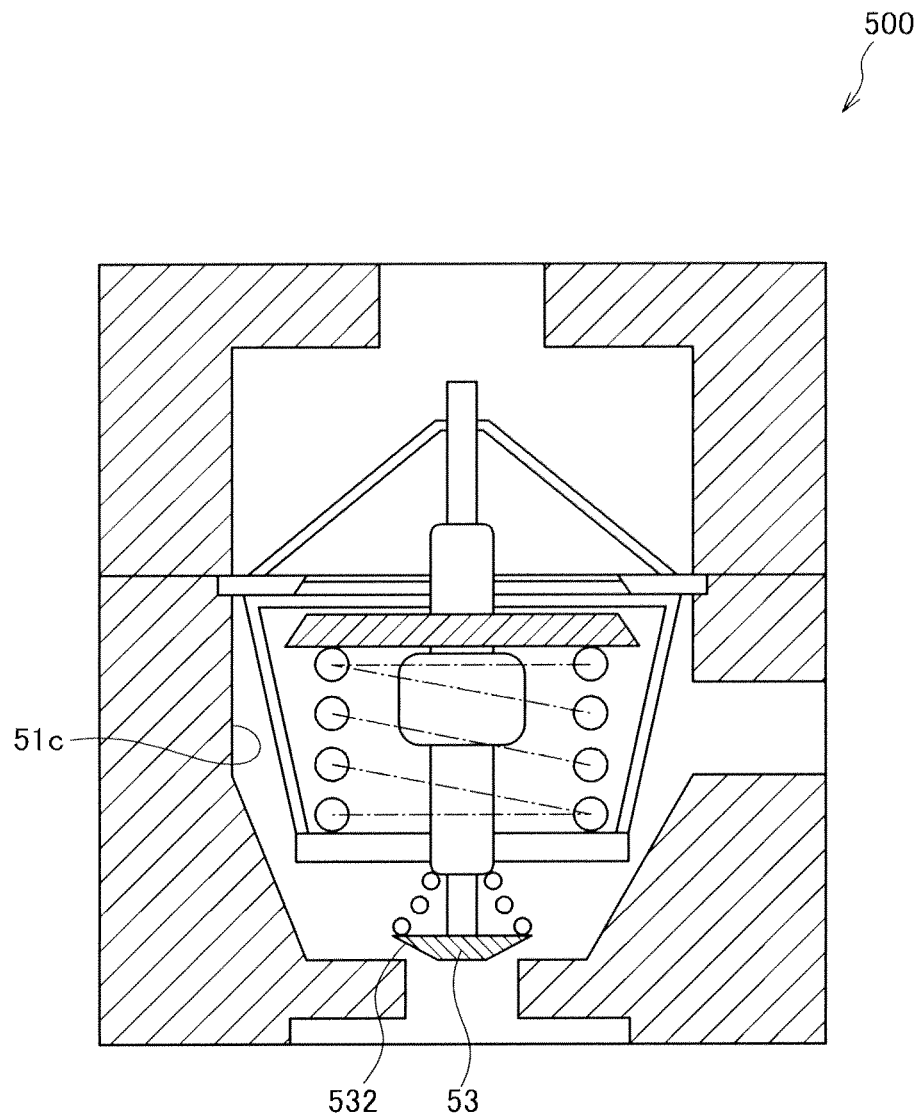
FIG. 17 is a cross-sectional drawing showing a structure of the thermostat valve according to the other embodiment of the present invention.
Figure 18:
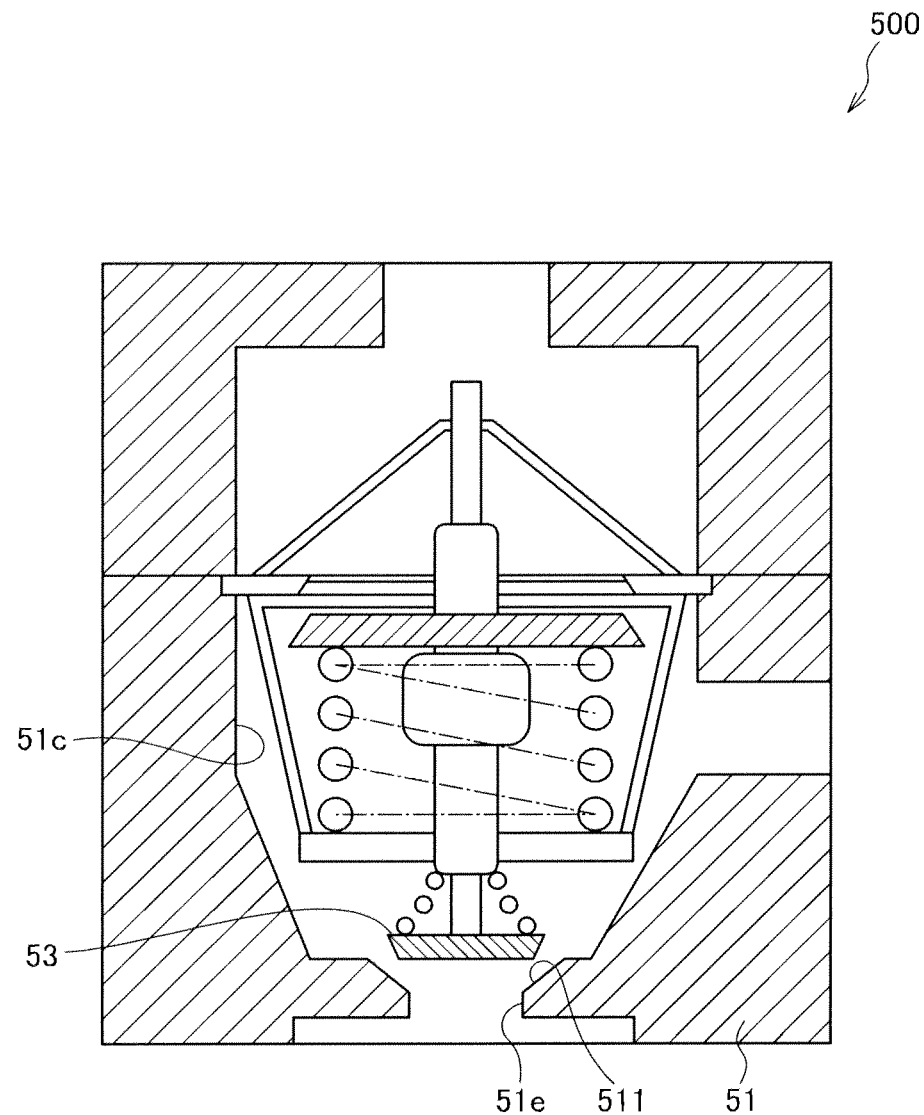
FIG. 18 is a cross-sectional drawing showing a structure of a thermostat valve according to the other embodiment of the present invention.

Furthermore, in the ninth embodiment, the communication holes 531 are disposed in the bypass valve 53, so that the high temperature cooling-liquid is allowed to flow into the intermediate temperature zone 51*c* through the communication holes 531 after the bypass valve 53 has closed. However, for example, as shown in FIG. 17, cutouts 532 may be formed in the bypass valve 53. In addition, as shown in FIG. 18, cutouts 511 may be formed in the housing 51 that forms the open mouth 51*e* on the high temperature side.

Also by means of forming the above cutouts 532 and 511, the same effects as the ninth embodiment are attainable.

Note that, each of the above embodiments may be appropriately combined with each other.

Note that, the present application claims priority of Japanese Patent Application No. 2011-146105 filed on Jun. 30, 2011 and Japanese Patent Application No. 2012-56387 filed on Mar. 13, 2012, the entire contents of which are incorporated herein by referring to them.

The invention claimed is:

1. A system for adjusting temperature of cooling-liquid for a fuel cell, comprising:
   a fuel cell;
   a radiator configured to radiate heat of the cooling-liquid;
   a cooling-liquid circulation flow-channel configured to connect the fuel cell and the radiator in a manner that the cooling-liquid flows in circulation;
   a radiator bypass flow-channel configured to connect an upstream and a downstream of the radiator in a manner that the cooling-liquid bypasses the radiator;
   a thermostat valve which is disposed in the radiator bypass flow-channel and is configured to adjust a flow-rate for flowing through the radiator bypass flow-channel; and
   a valve bypass flow-channel through which the cooling-liquid of the radiator bypass flow-channel flows at a predetermined amount even if the thermostat valve is fully opened.

2. The system for adjusting temperature of cooling-liquid for a fuel cell according to claim 1, wherein
   the valve bypass flow-channel is formed in a housing of the thermostat valve.

3. The system for adjusting temperature of cooling-liquid for a fuel cell according to claim 1, wherein
   a pressure loss in the valve bypass flow-channel is set in a manner that a maximum target flow-rate for the radiator is attainable.

4. The system for adjusting temperature of cooling-liquid for a fuel cell according to claim 1, wherein,
   a flow-rate ratio between a flow-rate for flowing through the radiator bypass flow-channel and flowing into the thermostat valve and a flow-rate for flowing through the valve bypass flow-channel is determined in a manner that an upper limit temperature of the cooling-liquid is attainable.

5. The system for adjusting temperature of cooling-liquid for a fuel cell according to claim 1, further comprising:
   a temperature setup unit configured to set up a higher target temperature of the cooling-liquid as a requested output is larger;
   a temperature sensor configured to detect the temperature of the cooling-liquid; and
   a cooling-liquid pump which is disposed in the cooling-liquid circulation flow-channel and is configured to control the flow-rate to be smaller as the temperature detected with the temperature sensor is lower relative to the target temperature.

6. The system for adjusting temperature of cooling-liquid for a fuel cell according to claim 5, further comprising:
   a humidity estimation unit configured to estimate a humidity of a cathode gas supplied to the fuel cell, wherein,
   the temperature setup unit sets up a higher target temperature of the cooling-liquid as the humidity of the cathode gas is higher.

7. The system for adjusting temperature of cooling-liquid for a fuel cell according to claim 5, further comprising:
   a correction unit configured to make a larger correction for the flow-rate of the cooling-liquid pump as the requested output is larger.

8. The system for adjusting temperature of cooling-liquid for a fuel cell according to claim 5, further comprising:
   a lower limit flow-rate computing unit configured to acquire a lower limit flow-rate of the cooling-liquid pump at the time when the temperature of the cooling-liquid flowing out of the fuel cell reaches an upper limit temperature; and
   a flow-rate limiting unit configured to limit the flow-rate of the cooling-liquid pump to the lower limit flow-rate at the time when the flow-rate of the cooling-liquid pump is below the lower limit flow-rate.

9. The system for adjusting temperature of cooling-liquid for a fuel cell according to claim 1, further comprising:
   a wetting setup unit configured to set up a target wet condition of the fuel cell based on a requested output;
   a wetting detect unit configured to detect a wet condition of a fuel cell; and
   a cooling-liquid pump which is disposed in the cooling-liquid circulation flow-channel and is configured to make the flow-rate smaller as the wet condition detected with the wetting detect unit is lower to dryness relative to the target wet condition.

10. The system for adjusting temperature of cooling-liquid for a fuel cell according to claim 1, wherein
    the bypass flow-channel is formed by opening through-holes in the thermostat valve or by cutting out the thermostat valve.

11. The system for adjusting temperature of cooling-liquid for a fuel cell according to claim 1, wherein
    the thermostat valve comprises:
       a housing, comprising:
          a low temperature zone in which a low temperature liquid flows,
          a high temperature zone in which a high temperature liquid flows, and
          an intermediate temperature zone which communicates with the low temperature zone through a low-temperature-side open mouth and communicates with the high temperature zone through a high-temperature-side open mouth;
       a valve on the low temperature side configured to open and close the low-temperature-side open mouth;
       a valve on the high temperature side configured to open and close the high-temperature-side open mouth;
       an expansion and contraction element which is connected to the valve on the low temperature side and the valve on the high temperature side, and is configured to control the temperature of a liquid inside of the intermediate temperature zone at a predetermined temperature, by adjusting a flow-rate of a liquid flowing into the intermediate temperature zone from the low temperature zone and a flow rate of a liquid flowing into the intermediate temperature zone from the high temperature zone by moving the valve on the low temperature side and the valve on the high temperature side by way of expansion and contraction in accordance with temperature; and
       the valve bypass flow-channel which is formed in the housing and is configured to allow an outflow-channel continuing to the intermediate temperature zone and the high temperature zone to be connected with each other.

12. The system for adjusting temperature of cooling-liquid for a fuel cell according to claim 1, wherein
    the thermostat valve comprises:
       a housing, comprising
          a low temperature zone in which a low temperature liquid flows,
          a high temperature zone in which a high temperature liquid flows, and an intermediate temperature zone which communicates with the low temperature zone through a low-temperature-side open mouth and communicates with the high temperature zone through a high-temperature-side open mouth;

an expansion and contraction element which is disposed inside of the intermediate temperature zone and is configured to expand and contract in accordance with temperature;

a valve configured to adjust a flow-rate of a liquid flowing into the intermediate temperature zone from the low temperature zone and a flow-rate of a liquid flowing into the intermediate temperature zone from the high temperature zone, in accordance with expansion and contraction of the expansion and contraction element; and a communication channel serving as the valve bypass flow-channel configured to allow the high temperature zone and the intermediate temperature zone to be communicated with each other.

13. The system for adjusting temperature of cooling-liquid for a fuel cell according to claim 12, wherein the valve comprises a valve on the high temperature side opening and closing the high-temperature-side open mouth, and the communication channel is a hole penetrating through the valve on the high temperature side.

14. The system for adjusting temperature of cooling-liquid for a fuel cell according to claim 12, wherein the valve comprises a valve on the high temperature side opening and closing the high-temperature-side open mouth, and the communication channel is formed between a cutout formed in the valve on the high temperature side and the high-temperature-side open mouth.

15. The system for adjusting temperature of cooling-liquid for a fuel cell according to claim 12, wherein the valve comprises a valve on the high temperature side opening and closing the high-temperature-side open mouth, and the communication channel is formed between the valve on the high temperature side and a cutout formed in the housing of the high-temperature-side open mouth on which the valve on the high temperature side abuts.

* * * * *